US009645044B2

(12) United States Patent
Fusco et al.

(10) Patent No.: US 9,645,044 B2
(45) Date of Patent: May 9, 2017

(54) CONTROLLED-CONTACT METHOD OF MEASURING INSERTION LOSS IN OPTICAL FIBER CONNECTORS

(71) Applicant: CORNING OPTICAL COMMUNICATIONS LLC, Hickory, NC (US)

(72) Inventors: Adam Joseph Fusco, Corning, NY (US); Daniel Ohen Ricketts, Corning, NY (US); James Scott Sutherland, Corning, NY (US); Neil David Vance, Addison, NY (US); Elvis Alberto Zambrano, Corning, NY (US)

(73) Assignee: Corning Optical Communications LLC, Hickory, NC (US)

( * ) Notice: Subject to any disclaimer, the term of this patent is extended or adjusted under 35 U.S.C. 154(b) by 473 days.

(21) Appl. No.: 14/501,542

(22) Filed: Sep. 30, 2014

(65) Prior Publication Data

US 2016/0091392 A1  Mar. 31, 2016

(51) Int. Cl.
*G01M 11/00*  (2006.01)
*G02B 6/38*  (2006.01)

(52) U.S. Cl.
CPC .......... *G01M 11/30* (2013.01); *G01M 11/33* (2013.01); *G02B 6/385* (2013.01)

(58) Field of Classification Search
CPC .................................................. G01M 11/33
See application file for complete search history.

(56) References Cited

U.S. PATENT DOCUMENTS

| 4,281,925 A * | 8/1981 | Forrest | G01M 11/33 356/243.1 |
| 4,854,701 A | 8/1989 | Noll et al. | 356/73.1 |

(Continued)

FOREIGN PATENT DOCUMENTS

| EP | 0506401 A2 | 9/1992 |
| JP | 2004109161 A | 4/2004 |

(Continued)

OTHER PUBLICATIONS

Bisbee, D. L. "Measurements of loss due to offsets and end separations of optical fibers." Bell System Technical Journal 50.10 (1971): 3159-3168.*

(Continued)

*Primary Examiner* — Kara E Geisel
*Assistant Examiner* — Shawn Decenzo

(57) ABSTRACT

A controlled-contact method of measuring an insertion loss of a compressible DUT having a first ferrule with a first optical fiber and a first end face is disclosed. The method utilizes a compressible reference connector having a second ferrule with a second optical fiber and a second end face. The method includes: axially aligning the first and second ferrules to define a gap with an axial gap distance of greater than 150 µm; moving the reference connector at a connector velocity in the range from 1 mm/s to 5 mm/s; when the gap distance is less than 150 µm, reducing the connector velocity to between 10 µm/s and 500 µm/s until contact while continuing to measure the coupled optical power; after contact, increasing the connector velocity as the reference and DUT connector axially compress. The insertion loss is determined from ongoing measurements of the coupled optical power.

22 Claims, 26 Drawing Sheets

(56) References Cited

U.S. PATENT DOCUMENTS

| | | | |
|---|---|---|---|
| 5,066,094 A | 11/1991 | Takahashi | |
| 5,125,514 A | 6/1992 | Oehler et al. | 209/590 |
| 5,748,299 A | 5/1998 | Esmaeili | 356/73.1 |
| 5,862,250 A | 1/1999 | Csipkes et al. | |
| 6,215,555 B1 | 4/2001 | Chivers | |
| 7,920,763 B1 * | 4/2011 | Shou | G02B 6/32 385/31 |
| 8,269,981 B1 | 9/2012 | Doerband et al. | |
| 2006/0078264 A1 | 4/2006 | Lauzier et al. | |
| 2012/0120485 A1 | 5/2012 | Ootomo et al. | |

FOREIGN PATENT DOCUMENTS

| | | | | |
|---|---|---|---|---|
| JP | 2005148580 A | 6/2005 | | |
| JP | 4190841 B2 | 12/2008 | | |
| JP | 2009-184584 | 8/2009 | | B61B 13/00 |
| JP | 2009184584 A | 8/2009 | | |
| JP | 201014426 A | 1/2010 | | |
| JP | 2010261934 A | 11/2010 | | |
| JP | 201138829 A | 2/2011 | | |
| JP | 2011107625 A | 6/2011 | | |
| JP | 201324748 A | 2/2013 | | |
| JP | 5221492 B2 | 6/2013 | | |
| WO | 9838475 A1 | 9/1998 | | |
| WO | 2004113981 A1 | 12/2004 | | |
| WO | WO2014002882 A1 | 1/2014 | | A61B 1/00 |

OTHER PUBLICATIONS

Patent Cooperation Treaty International Search Report, Application No. PCT/US2015/051372, Jan. 5, 2016, 4 pages.

* cited by examiner

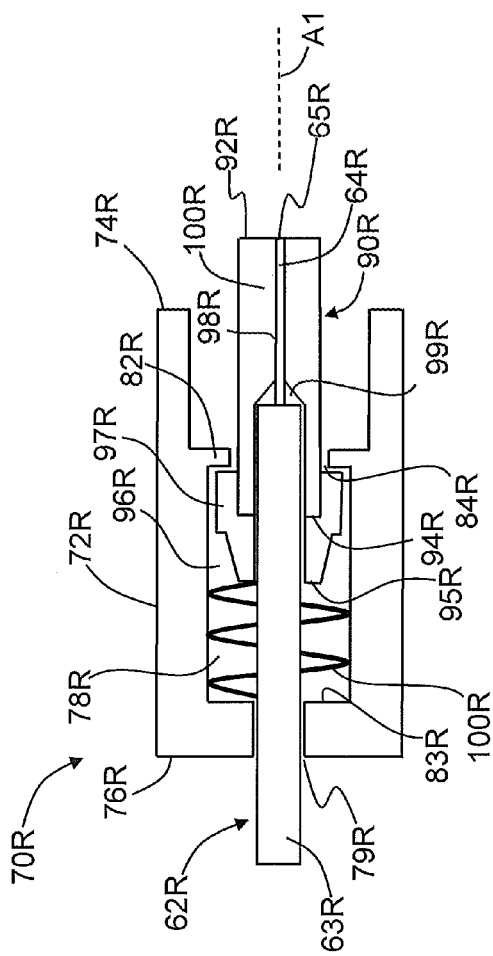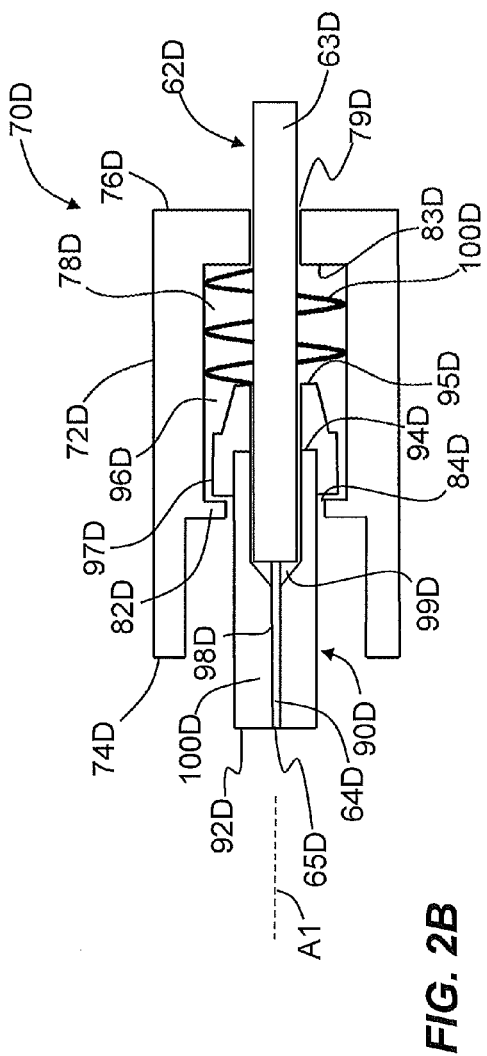
FIG. 2A
FIG. 2B

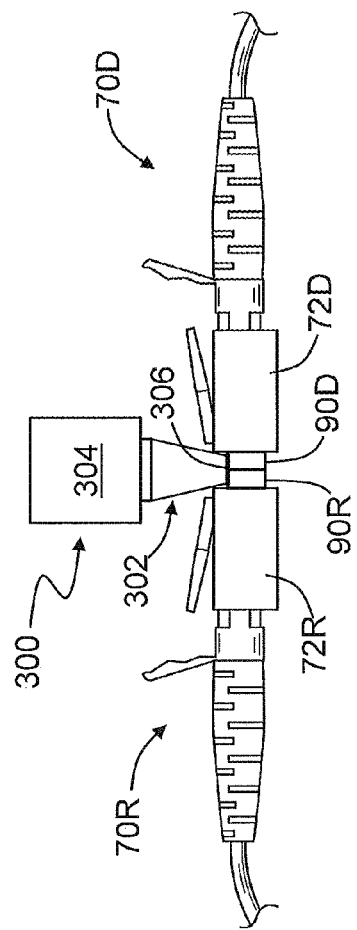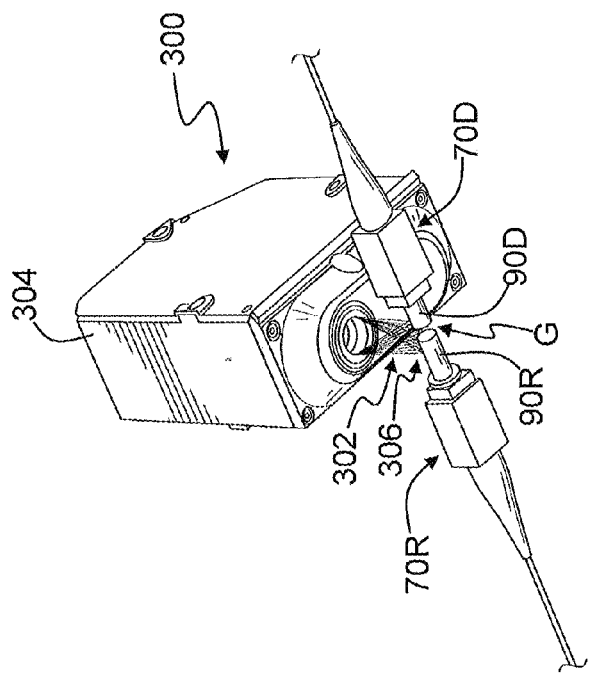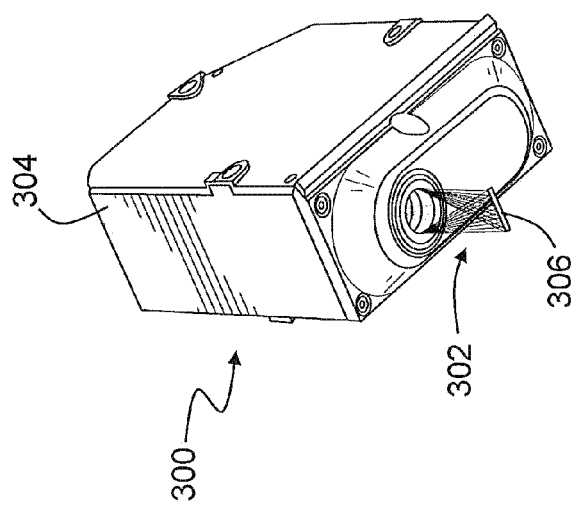
FIG. 6B
FIG. 6C
FIG. 6D

CONTROLLED-CONTACT METHOD OF MEASURING INSERTION LOSS IN OPTICAL FIBER CONNECTORS

CROSS-REFERENCE TO RELATED APPLICATIONS

This application is related to co-owned U.S. patent application Ser. No. 14/447,133, entitled "Non-contact method of measuring insertion loss in optical fiber connectors," which is incorporated by reference herein and is referred to below as the '133 application, and U.S. patent application Ser. No. 14/472,954, entitled "Non-contact method of measuring insertion loss in optical fiber connectors using active alignment," which is incorporated by reference herein and which is referred to below as the '954 application.

FIELD

The present disclosure relates to optical fiber connectors, and in particular relates to a controlled-contact method of measuring insertion loss in optical fiber connectors.

BACKGROUND

Optical fiber connectors are used to optically connect one optical fiber to another. One parameter used to measure the quality of the optical fiber connection made by the optical fiber connector is the insertion loss (IL), which is a measure of how much light is lost when passing from one fiber to the other through the optical fiber connector. In some configurations, the optical fiber connector being evaluated is referred to as the device under test (DUT) and the connector to which the DUT is connected is called the reference connector or reference jumper.

Current IL measurement methods used by most optical connector manufacturers require physical contact of the end faces of the DUT and the reference connectors, or the use of an index matching fluid between them. This method is useful because it measures the insertion loss under conditions that are very similar if not identical to the conditions in the field. A problem with the contact-based measurement approach however is that when the polished ends of the fibers are brought into contact, they can suffer damage.

It would therefore be beneficial to be able to perform contact-based IL measurements in a manner that reduces or eliminates the risk of damage to the polished fiber ends.

SUMMARY

Aspects of the disclosure are directed to a controlled-contact method of measuring the insertion loss of an optical fiber connector. The method reduces the number of scrapped connectors resulting from end face damage and also reduces inspection costs associated with specialized reference jumpers that need to be replaced due to wear and tear from contact with the DUT connector. The controlled-contact methods of measuring the insertion loss reduce the risk of damage to the fiber end faces for both the DUT and reference connectors.

The methods disclosed herein are based on fundamental theories of optical coupling and they reduce measurement variability as compared to the traditional contact methods. The methods include controlling the connector velocity at contact and the compression distance beyond contact. By reducing the connector velocity at contact to a velocity of one to two orders of magnitude below the conventionally used velocity, the damage to the reference connector and the DUT connector can be minimized. This extends the lifetime of the reference connectors and reduces overall connector manufacturing cost. An additional benefit is a more repeatable measurement result.

An aspect of the disclosure is a controlled-contact method of measuring an insertion loss of DUT connector having a first ferrule with a first optical fiber and a first end face with a reference connector having a second ferrule with a second optical fiber and a second end face. The method includes: axially aligning the first and second ferrules so that the first and second end faces are confronting and spaced apart to define a variable gap having a gap distance with an initial value; reducing the gap distance at a first rate by moving the reference and DUT connectors together at a connector velocity in the range of 1 mm/s to 5 mm/s while measuring a coupled optical power between the first and second optical fibers; reducing the gap distance at a second rate slower than the first rate by reducing the connector velocity to be in the range from 5 μm/s to 500 μm/s while measuring the coupled optical power, until the first and second end faces come into contact at a gap distance of 0 μm, while continuing to measure the coupled optical power; after the first and second ferrules are in contact, either maintaining or increasing the connector velocity and subjecting the ferrules to an axial compression force while continuing to measure the coupled optical power; and measuring the insertion loss based on the measured coupled optical power as a function of the gap distance.

Another aspect of the disclosure is controlled-contact method of measuring the insertion loss of a compressible DUT connector having a first ferrule with a first optical fiber and a first end face with a compressible reference connector having a second ferrule with a second optical fiber and a second end face. The method includes: moving the reference connector toward the DUT connector at a first reference-connector velocity the range from 1 mm/s to 5 mm/s when the first and second end faces are separated by a gap distance of greater than 150 μm while measuring an amount of coupled optical power between the first and second optical fibers; moving the reference connector toward the DUT connector at a second reference-connector velocity the range from 10 μm/s to 100 μm/s when the first and second end faces are separated by a gap distance of less than 150 μm while continuing to measure the amount of coupled optical power as a function of the gap distance; moving the reference connector toward the DUT connector at a third reference-connector velocity equal to or greater than the second reference-connector velocity when the first and second end faces are in contact and the reference and DUT connectors compress to a compression distance while continuing to measuring the amount of coupled optical power as a function of the gap distance; and determining the insertion loss based on the measured amount of coupled optical power as a function of the gap distance.

Another aspect of the disclosure is a controlled-contact method of measuring the insertion loss of a compressible DUT connector having a first ferrule with a first optical fiber and a first end face with a compressible reference connector having a second ferrule with a second optical fiber and a second end face. The method includes: axially aligning the first and second ferrules of the reference and DUT connectors to define a gap distance of at least 200 μm; causing the first and second end faces to approach each other at a connector velocity in the range from 1 mm/s to 5 mm/s while maintain the axial alignment and while measuring an insertion loss between the first and second optical fibers; when the gap distance is in the range from 0 to 200 μm, reducing the connector velocity to be in the range from 10 µm/s to 500 µm until the first and second end faces are in contact, while maintaining the axial alignment and while measuring the insertion loss; and after the first and second end faces are in contact, increasing the connector velocity while subjecting the first and second ferrules to an axial compression force while measuring the insertion loss.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which:

FIGS. 2A and 2B are close-up, cross-sectional views of example reference and DUT optical fiber connectors, respectively, wherein the ferrule and the connector housing of each connector are mechanically decoupled through the use of a resilient member;

FIG. 6B is a upward looking view of an example position measuring system in the form of a scanning laser profilometer;

FIG. 6C is similar to FIG. 6B and shows the ferrules of the reference and DUT connectors within the line scanning field of view;

FIG. 6D is a side view of an example test configuration using the IL measurement system of FIG. 5, showing mated LC reference and DUT connectors and the scanning laser profilometer scanning their respective ferrules;

DETAILED DESCRIPTION

Figure 1:
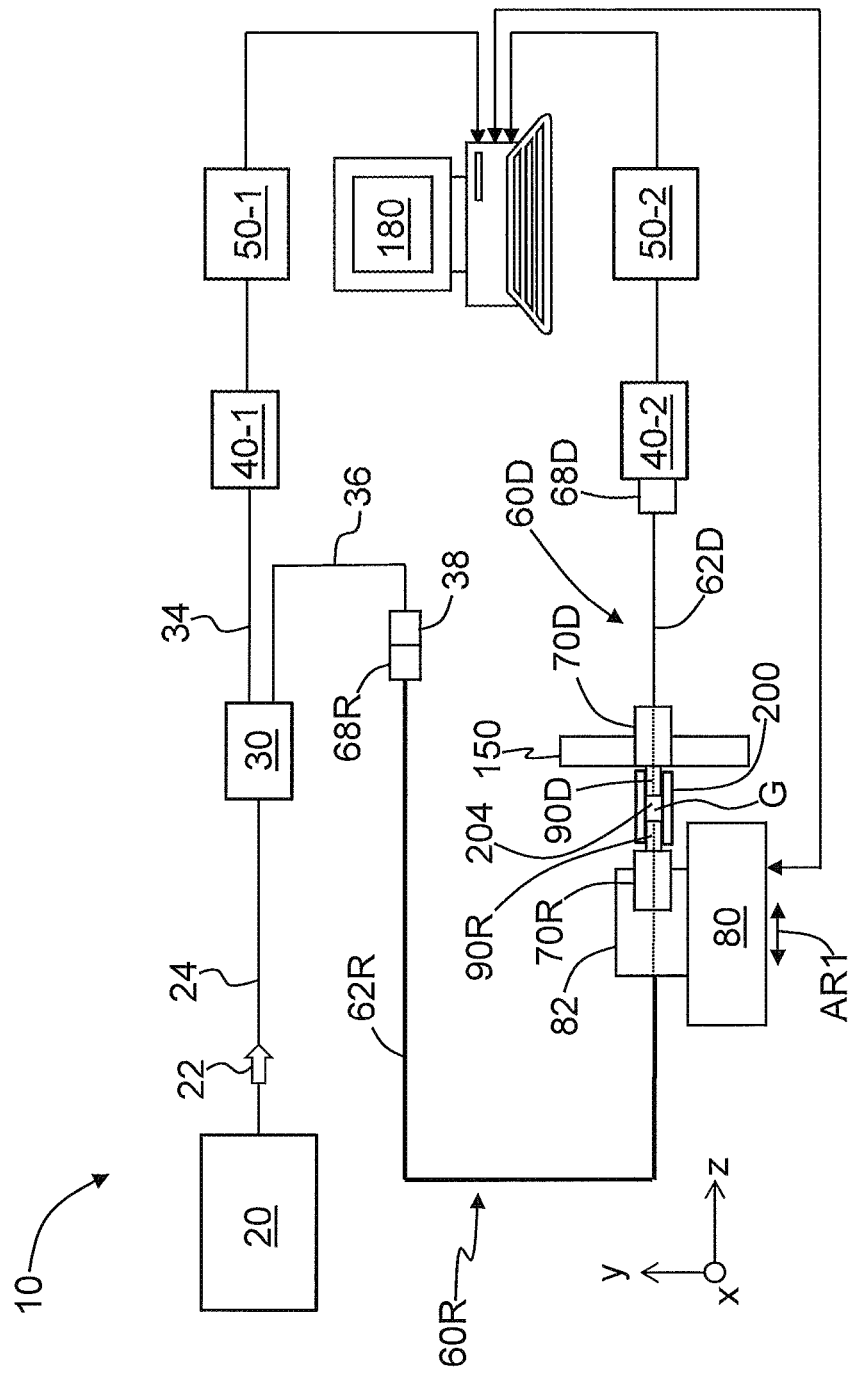
FIG. 1 is a schematic diagram of an example measurement system for measuring the insertion loss between two optical fiber connectors, wherein the system employs passive alignment of the connectors using an alignment member.

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

In the discussion below, the term "optical fiber connector" is referred to as "connector" for short. The acronym APC stands for "angled physical contact" and denotes an angled fiber end face while the acronym UPC stand for "ultra-physical contact" and denotes a non-angled or flat fiber end face.

Also in the discussion below and in the drawings, IL stands for "insertion loss" as noted above, while $IL_M$ stands for "measured insertion loss." Further, $P_S$ stands for the "stage position," and $P_C$ stands for the "contact position" of the stage when the ferrule end faces of the DUT and reference connectors are in contact, i.e., for the condition d=0 μm.

Also in the discussion below, the stage velocity $v_S$ defines the connector velocity v of the reference connector since the stage supports the reference connector. The terms "connector velocity" as used herein is synonymous with "ferrule velocity" unless otherwise noted, and the stage velocity is the same as the connector velocity unless otherwise noted. The connector velocity is discussed below as the being the velocity of the reference connector, but more generally the connector velocity is understood as being a relative velocity that defines how fast the two connectors are approaching each other and accounts for the fact that in some examples, both connectors are moving while in other examples only one connector is moving.

In addition, the "distance beyond contact" is denoted $d_{BC}$ and is the same as the compression distance.

The controlled-contact method disclosed herein is presented by way of example and ease of discussion by considering SMF-28 single-mode fiber SC-UPC type connectors such as shown in FIGS. 2A and 2B, introduced and discussed below. However, the methods are broadly applicable to a wide range of optical interconnection configurations and device types, including: connectors with any type of single-mode fiber, such as SMF-28 fiber, DS fiber and LS fiber; connectors with any type of multimode fiber, such as for 50 μm and 62 μm core diameter, step index and graded index core profiles; connectors with flat (UPC) or angled (APC) ferrule end faces; connectors that use any kind of passive alignment feature (SC, FC, ST or LC type connector) or member that maintains core pin and hole-based connectors, such as MTP and MT-RJ configurations. System 10 can also be used to characterize devices that provide a 1:N optical split function, where the N splitter output connectors are attached to the measurement system in N separate measurements.

In addition, the methods disclosed herein are applicable to connectors attached to any type of photonic device besides optical fibers, such as passive devices like jumper cables, splitters, filters, etc., and active devices like laser sources, switches, modulators, etc. The methods can also be applied to non-connectorized devices, such as bare fibers, large diameter fibers, multicore fibers, and fibers in fiber splicers.

Controlled-Contact IL Measurement System

FIG. 1 is a schematic diagram of an example controlled-contact IL measurement system ("system") 10 for carrying out the various aspects of the controlled-contact IL measurement method disclosed herein. System 10 includes a laser source 20 that emits light 22 of wavelength A, which can be any of the wavelength bands used in optical communications, e.g., 850 nm, 1330 nm, 1550 nm, etc. Laser source 20 is optically coupled to a splitter 30 via an optical fiber section 24. The splitter 30 is optically coupled to a first detector 40-1 (e.g., via an optical fiber section 34). First detector 40-1 in turn is electrically connected to a first power meter 50-1. In an example, splitter 30 is a 50:50 splitter.

The splitter 30 is also optically connected to a reference jumper cable 60R, e.g., via an optical fiber section 36 that includes a connector 38. Reference jumper cable 60R includes an optical fiber 62R that includes at one end a connector 68R that engages with connector 38 of optical fiber section 36, and includes at the other end a connector 70R, which is referred to hereinafter as the "reference connector," and which is described in greater detail below. The reference connector 70R is supported by a support fixture 82 of a computer-controlled stage ("stage") 80, which is configured to move the reference connector in at least the z-direction in precise amounts, as indicated by the double arrow AR1. In an example, stage 80 is configured to provide precise movements in the x, y and z directions. As described below in connection with FIG. 2A, the reference connector 70R includes a ferrule 90R that supports a bare section 64R of optical fiber 62R, with the bare section 64R having an end face 65R at the ferrule front end (or end face) 92R.

System 10 also includes a mounting fixture 150 that operably supports a DUT connector 70D that is part of a DUT cable 60D having a DUT fiber 62D. The DUT fiber 62D is optically connected to a second detector 40-2 via a connector 68D. The second detector 40-2 is electrically connected to a second power meter 50-2. The first and second power meters 50-1 and 50-2, along with the computer-controlled stage 80 are operably connected to a controller (or computer) 180.

System 10 also includes an alignment member 200 with an interior 204. In an example, alignment member 200 is in the form of a sleeve or tube. The respective ferrules 90R and 90D of the reference and DUT connectors 70R and 70D are inserted into opposite ends of alignment member 200 so that the respective ferrule front ends 92R and 92D (and thus the respective fiber end faces 65R and 65D) face one another (i.e., are confronting) and define a gap G, wherein the end faces are spaced apart by an axial distance d, referred to below as the gap distance.

FIGS. 2A and 2B are close-up, cross-sectional view of example reference and DUT connectors 70R and 70D, respectively. In the discussion above and below, connector components of reference connector 70R include an "R" in the reference number while connector components of DUT connector 70D include a "D" in the reference number. When referring to a connector 70 in general (i.e., elements/aspects/components common to reference connecter 70R and DUT connector 70D), the "D" and "R" suffix is omitted. The same applies to optical fiber 62R and DUT fiber 62D.

Connector 70 includes a housing 72 having a central axis A1, an open front-end 74, a back end 76 and an interior chamber 78 adjacent the back end. Housing 72 is shown as a single component to simplify matters, but may be an assembly comprising multiple components to define interior chamber 78, as is well-known. Housing back end 76 includes an aperture 79. The interior chamber 78 is defined in part by front and rear chamber walls 82 and 83 within housing 72, with the front chamber wall having an aperture 84. Connector 70 also includes the aforementioned ferrule 90, which has a front end (end face) 92 and a back end 94. The ferrule 90 has a longitudinal bore 98 that extends from back end 94 to front end 92. Although longitudinal bore 98 is shown as including sections of different diameter, in alternative embodiments the longitudinal bore 98 may have a constant or substantially constant diameter.

The ferrule 90 is arranged in housing 72 along central axis A1, with the flanged back end residing with interior chamber 78 and the ferrule extending through aperture 84, with the ferrule front end 92 extending from housing open front end 74. The optical fiber 62 includes a jacketed section 63 and the bare section 64. The optical fiber 62 passes through aperture 79 at the back end 76 of housing 72 and extends through interior chamber 78 and into ferrule 90, with the jacketed section 63 extending partway into ferrule bore 98. In other embodiments, ferrule bore 98 may not include a section large enough to accommodate the jacketed section 63. The bare fiber section 64 extends to the front end 92 of ferrule 90 and is supported within the ferrule bore 98 by a bonding material 99. A resilient member 100 (e.g., a spring) resides in interior chamber 78 and contacts the rear chamber wall 83 and a flange 95 of a ferrule holder 97. In connector 70, ferrule 90 and ferrule holder 95 are mechanically decoupled from connector housing 72 by resilient member 100.

Figure 3A:
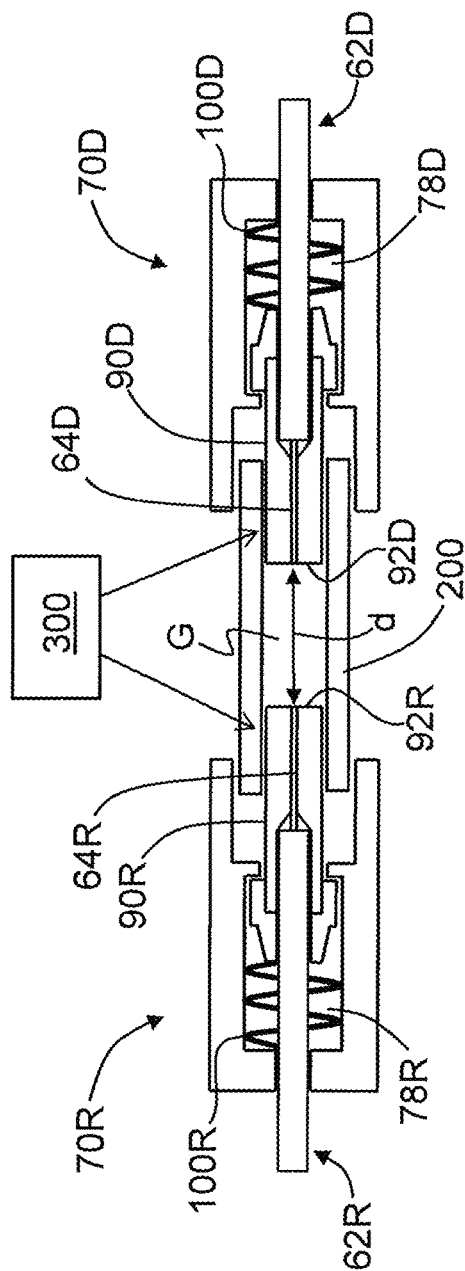
FIG. 3A is a close-up view of the portion of the measurement system of FIG. 1, wherein the reference connector and the DUT connector are inserted into opposite ends of an alignment member so that the ferrule end faces are spaced apart and face each other to define a gap having an axial gap distance d, which can be varied by moving the reference connector ferrule.

FIG. 3A is a close-up view of the reference connector 70R and DUT connector 70D operably arranged with their respective ferrules 90R and 90D inserted into the opposite ends of alignment member 200. When an axial compression force is applied on ferrule front ends 92R and 92D, the respective resilient members 100R and 100D compress, and the ferrules retract into their respective interior chamber 78R and 78D. The reference and DUT connectors are thus "compressible."

Figure 3B:
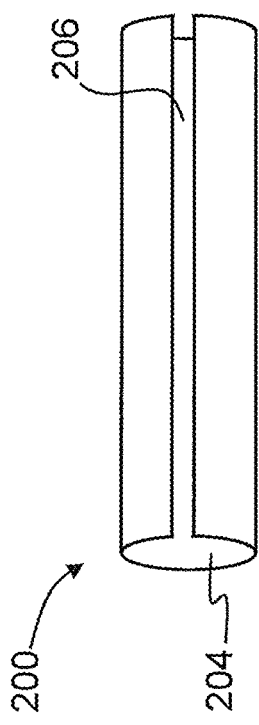
FIG. 3B is a side view of an example alignment member in the form of a sleeve having a "C" shape.

FIG. 3B is a side view of an example alignment member 200 in the form of a sleeve having a "C" shape that is defined in part by a slot 206. In an example, the C-shaped sleeve is made of ceramic and is used for passive alignment. Alternative alignment members may also be employed to axially align connector ferrules, such as V-groove blocks, multiple precision flat surfaces, or other clamping fixtures.

Figure 4B:
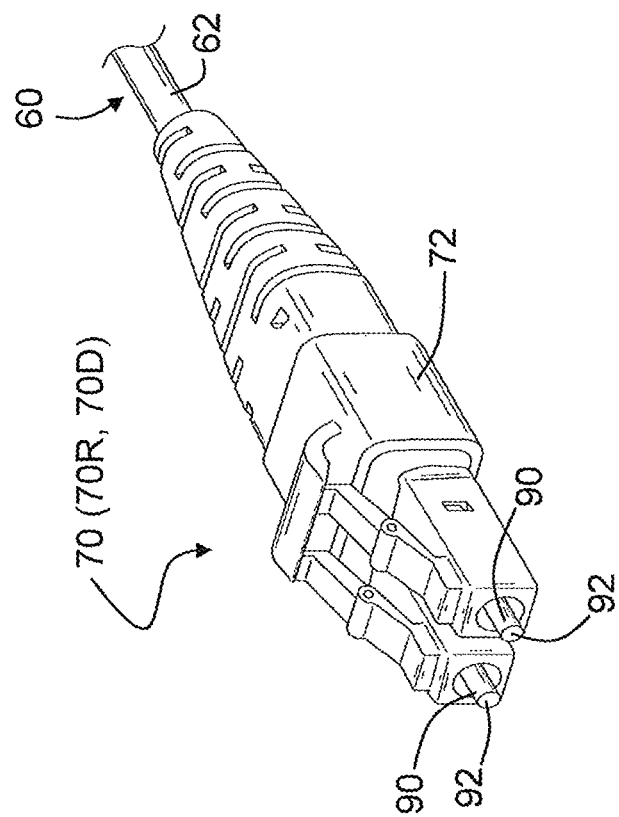
FIG. 4B is an elevated view of an example LC connector that can be either the reference or the DUT connector.
Figure 4A:
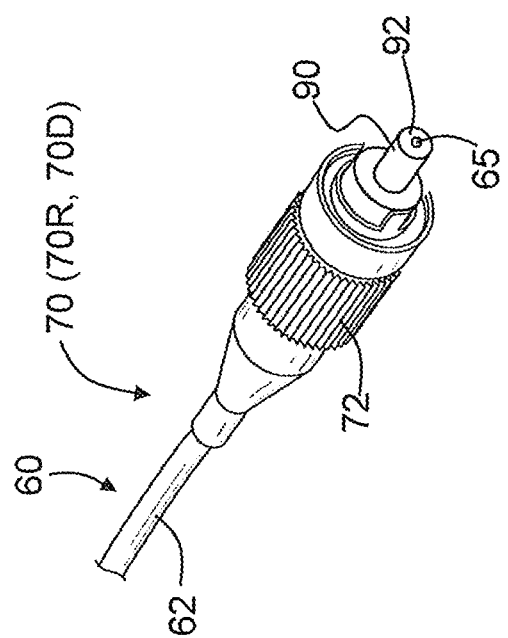
FIG. 4A is an elevated view of an example FC connector that can be either the reference or the DUT connector.

FIG. 4A is an elevated view of an example FC connector 70 that can be either the reference connector 70R or the DUT connector 70D, while FIG. 4B is an elevated view of an example LC connector 70 that can be either the reference connector 70R or the DUT connector 70D.

In a contact-based IL measurement method, when the reference and DUT connectors 70R and 70D are inserted into the opposite ends of alignment member 200 and moved toward each other, the respective ferrule end faces 92 ultimately meet within the member and are forced into contact (i.e., the gap distance d becomes zero μm). In this case, an additional axial compression force is typically applied to drive the ferrule end faces 92R and 92D into firm contact. This additional force leads to additional compression of resilient members 100R and 100D.

System 10 is configured to perform the controlled-contact insertion loss measurement method disclosed herein by precisely adjusting the movement of the reference and DUT connectors 70R and 70D and the gap distance d of the ferrule front ends 92R and 92D (and thus the respective fiber end faces 65R and 65D) of the reference and DUT connectors 70R and 70D. In the example configuration of system 10, the reference connector 70R is mounted on stage 80 using fixture 82 so that the z-axis is substantially parallel to the connector ferrule axis. The DUT connector 70D can be fixed in place during the measurement method. In an example configuration of system 10, the DUT connector 70D is mounted in fixture 150 positioned on a front panel (not shown) of the measurement system while the reference connector 70R is mounted on stage 80 using the aforementioned fixture 82 (FIG. 1).

The DUT connector 70D may be attached to mounting fixture 150 by gripping a portion of ferrule 90D or alternatively by gripping a portion of the connector housing 72D. Gripping ferrule 90D may be difficult because of its small size, and because at least a portion of the ferrule must also be inserted into alignment member 200. Therefore in the most general case, the DUT connector 70D is gripped by making contact with molded features (not shown) of its connector housing 72D. These features may include molded depressions and/or tabs that are normally engaged by adapter fingers or clips to retain the DUT connector inside an adapter and hold the two connector end faces in contact.

In an example, ferrule 90D of the DUT connector 70D is retained within a cylindrical cavity (not shown) formed in mounting fixture 150. In an example, an aperture on the DUT connector mount retains alignment member 200 on the reference connector ferrule 90R when the DUT connector 70D is removed from the DUT connector mount.

System 10 is configured to measure the amount of light 22 coupled from reference optical fiber 64R associated with reference connector 70R into the DUT optical fiber 64D associated with DUT connector 70D as the respective ferrules 90R and 90D are moved closer to each other within alignment member 200 (FIG. 3). In the operation of system 10, light 22 from light source 20 is directed though splitter 30 so that a portion of the light may be monitored over time at first detector 40-1. The other portion of light 22 from splitter 30 is directed to reference jumper cable 60R via a low-back-reflection optical connector 68. This light passes 22 through the reference jumper cable 60, exits bare fiber 64R at its end face 65R and then propagates through gap G over the distance d to DUT connector 70D and to the end face 65D of DUT bare fiber 64D. The coupled light then propagates down the DUT optical fiber 62D of the DUT jumper cable 60D and exits at a second DUT connector 68D and is then measured by second detector 40-2.

System 10 periodically samples the two measured power levels $P_1$ and $P_2$ at detectors 40-1 and 40-2, respectively, and calculates a measured insertion loss IL, defined as $IL_M = -10 \log_{10}(P_2/P_1)$. This calculation takes place in computer (controller) 180. This measured insertion loss value $IL_M$ is taken on an ongoing basis as the gap distance d changes, with the measured values of $IL_M$ correlated with corresponding time and/or stage position measurements and/or values of the gap distance d.

A suitable light source 20 is a laser source, such as the Greenlee Model 580XL, that operates at either 1550 nm or 1330 nm. Suitable first and second detectors 40-1 and 40-2 are Newport 918-IS-I, 850-1600 nm broad-area detectors. Suitable first and second power meters 50-1 and 50-2 are Newport 1936-R power meters having a single channel and a USB interface. A suitable splitter 30 is the ThorLabs 2×2 Single Mode Fused Fiber Optic Coupler/Tap. Suitable fixtures 82 and 150 for holding reference connector 70 and DUT connector 70 include Newport 561-SCH SC Connector Holders. A suitable stage 80 is the Newport 562-XYZ ULTRAlign™ Fiber Alignment Stage, and motorized stage actuators include the Newport LTA-HS Actuator. An example motion stage controller is the Newport ESP-301 3-Axis Motion Controller. Other suitable elements of system 10 include Analog USB Chassis from National Instruments, NI cDaq-9184, an Analog Module from National Instruments, NI USB-9239, 4-channel input. Computer 180 can be PC controller such as the Advantec PC that runs LabView 2012 SP2 and Windows Office 2010. In practice, any of the laser sources, detectors and power meters referenced above can be replaced with other similar performing models based on availability and form-factor preference.

In an example, reference connector 70R is generally retained on stage 80 using fixture 82, which in an example grips connector housing 72R instead of ferrule 90R. Accordingly, one concern is that a precise displacement of stage 80 and connector housing 72 will not result in an equally precise displacement of the ferrule end face 92R within the interior 204 of alignment member 200. For example, excessive friction at the ferrule/member interface can cause gripping and slipping that can decorrelate stage motions and ferrule motions. If reference ferrule 90R gets stuck in one position within alignment member 200, additional motion of stage 80 will tend to further compress the alignment member until static friction at the ferrule/member interface is overcome. At this point, the reference ferrule 90R slides rapidly within interior 204 of alignment member 200, possibly resulting in a short-lived high velocity that prevents accurate measurement of optical coupling between the reference and DUT connectors 70R and 70D.

Experiments have been carried using system 10 to examine the correlation between the motion of connector housing 72R via stage displacement and the motion of ferrule 90R within a ceramic alignment member 200. It was found that initial stage displacement does not result in ferrule motion, as the resilient member 100R must be compressed sufficiently to overcome dynamic friction at the ferrule/member interface. For an SC reference connector 70R, this compression distance has been measured to be around 100 μm.

Once the reference connector's resilient member 100R has been sufficiently compressed, experimental results indicate that as long as the stage velocity $v_S$ exceeds a minimum value (e.g., 3 μm/s for an SC ferrule in an SC alignment member), static friction effects are overcome and the ferrule 90R slides smoothly within interior 204 the alignment member 200 at a velocity that is identical to the stage velocity $v_S$. If the stage velocity $v_S$ is less than the minimum velocity value, the ferrule 90R can tend to grip and slip within alignment member 200. A high correlation between stage and ferrule position is needed for accurate optical power measurements, especially at high velocities where interference fringe resolution may be limited by detector sample rate.

Figure 5:
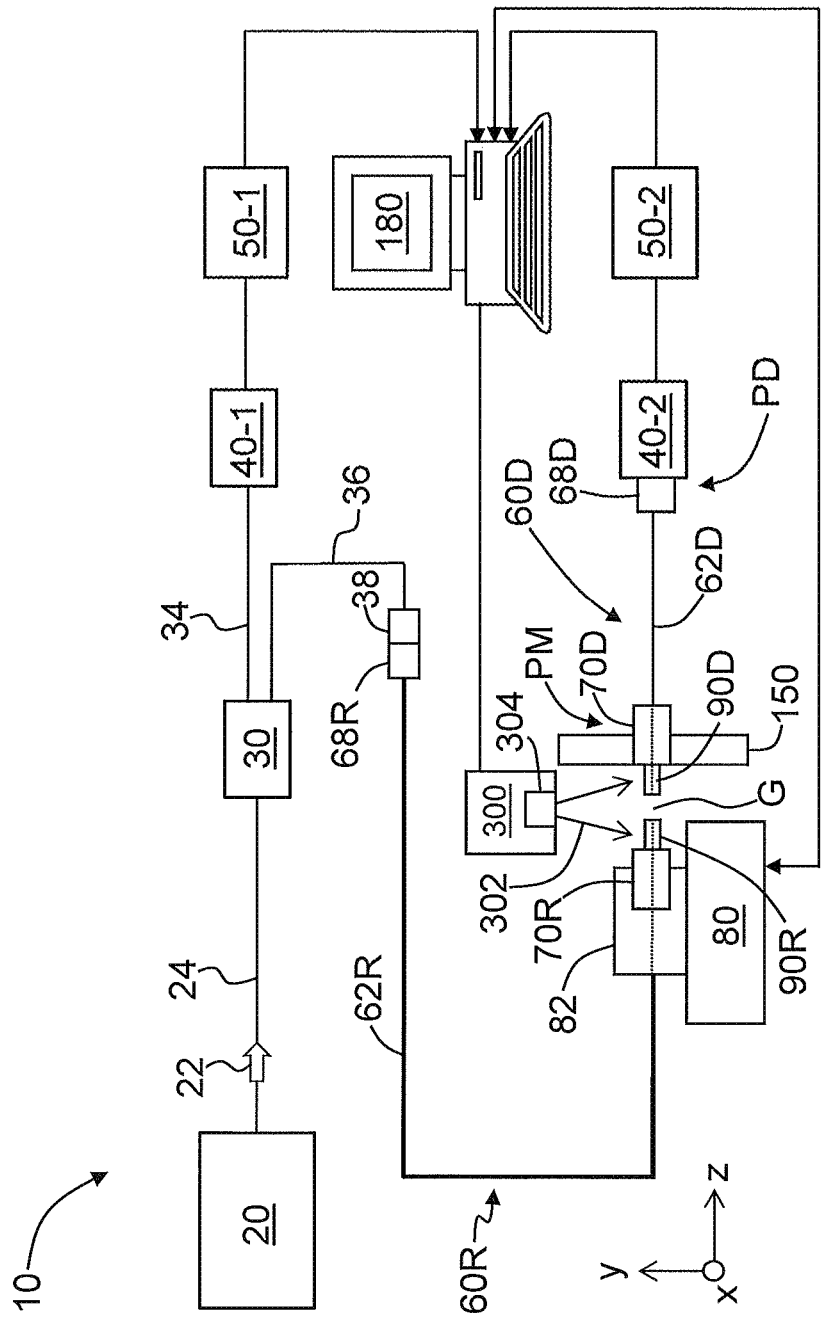
FIG. 5 is a schematic diagram of an example IL measurement system similar to that shown in FIG. 1A but that employs active alignment using a position measurement system.

FIG. 5 is a schematic diagram of an example system 10 similar to that shown in FIG. 1, but that employs active alignment. Thus, rather than employing passive alignment member 200, the system 10 of FIG. 5 includes a position measuring system (PMS) 300 arranged to view or otherwise inspect ferrule front ends 92R and 92D and gap G therebetween. The PMS 300 is operably connected to controller 180. In an example, PMS 300 includes a viewing system 304, which in one example is or includes a machine vision system, while in another example is or includes a laser profilometer system.

Figure 6A:
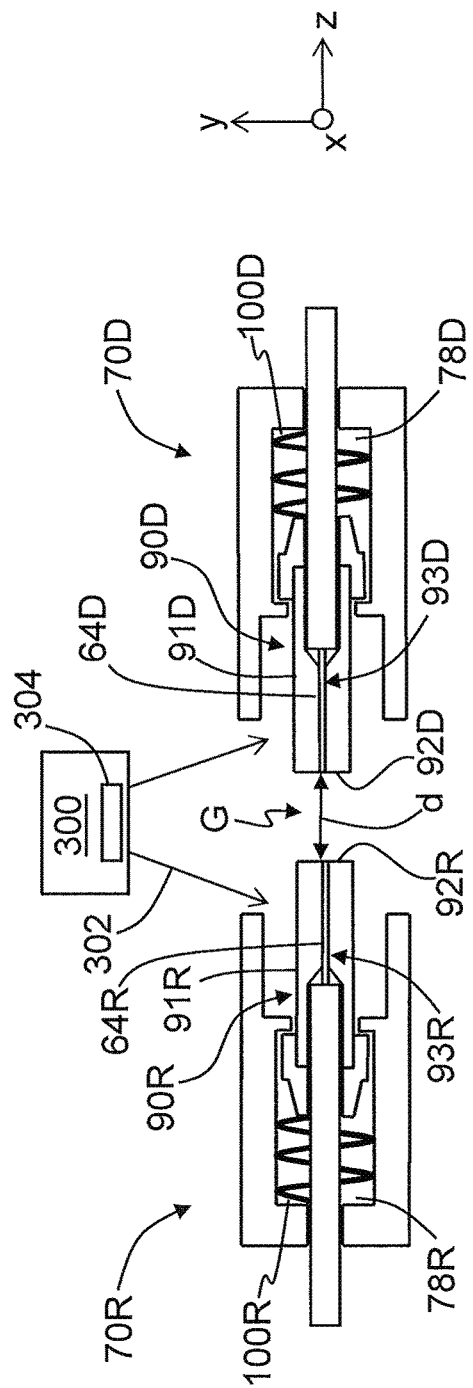
FIG. 6A is a close-up view of the portion of the IL measurement system of FIG. 5, wherein the alignment of the respective ferrules of the reference connector and the DUT connector is measured by the position measurement system as the gap distance d is varied during the IL measurement process.

FIG. 6A is similar to FIG. 3A and shows a close-up view of the reference connector 70R and DUT connector 70D operably arranged with their respective ferrules 90R and 90D in a substantially aligned and confronting configuration and within a field of view (FOV) or measurement range 302 of viewing system 304. When an axial compression force is applied on ferrule front ends 92R and 92D, the respective resilient members 100R and 100D compress, and the ferrules retract into their respective interior chamber 78R and 78D.

FIG. 6B is an upward looking view of an example PMS 300 that includes a scanning laser profilometer (e.g., Keyence LT-9010), while FIG. 6C is similar to FIG. 6B shows the reference and DUT connectors 70R and 70D within the FOV 302 of the laser profilometer. The laser profilometer is configured to measure the surface profile of the confronting reference and DUT ferrules 90R and 90D. The laser scan line 306 of the laser profilometer that defines FOV 302 is also shown. FIG. 6C is a side view of an example test configuration of system 10 showing mated LC reference and DUT connectors 70R and 70D and the scanning laser profilometer of PMS 300. PMS 300 can measure the gap distance d and provide feedback to controller 180 for controlling the position and speed of the reference connector 72R as a function of the gap distance d.

After each connector IL measurement, measurement system 10 can also make an estimate of IL associated with the jumper cable optical link between connectors. Unless otherwise noted, a DUT measurement refers to the IL measurement performed on a single jumper cable connector.

Controlled-Contact IL Measurement Method

System 10 is used to carry out the controlled-contact method of measuring the insertion loss of a DUT connector 70D. In an example, the measurement method involves the following main steps:

1) Inserting a DUT connector 70D into mounting fixture 150 of system 10.
2) Coaxially aligning the DUT connector ferrule 90D with a reference connector ferrule 90R using either passive alignment via alignment member 200 or active alignment via PMS 300 to establish an initial gap distance d. In an example, the initial gap distance d (i.e., the initial value of the gap distance) is in the range 50 μm d 300 μm. In another example, the initial gap distance d>150 μm. In another example, the initial gap distance d>200 μm.
3) Maintaining coaxial alignment while reducing the gap distance d from its initial value at a first rate in an approach phase wherein the reference connector has an approach velocity $v_A$ while measuring optical power coupled between the reference and DUT connectors 70R and 70D.
4) Continuing to reduce the gap distance by bringing the reference and DUT connector ferrule end faces into contact in a contact phase at a second rate that is less than the first rate by using a reduced contact velocity $v_C<v_A$ while continuing to measure the coupled optical power.
5) Once the reference and DUT ferrules 90R and 90D are in contact, changing the velocity to $V_{COMP}$ and subjecting the ferrules to an axial compression force in a compression phase that compresses the resilient members 100R and 100D of the reference and DUT connectors 70R and 70D respectively, while continuing to measure the coupled optical power.

Thus, there are three main phases or steps in the method: the approach phase, the contact phase and the compression phase, with each having a corresponding connector approach velocity $v_A$, a connector contact velocity $v_C$ and a connector compression velocity $V_{COMP}$. By varying the stage velocity $v_S$ of stage 80 over these three phases to define the aforementioned connector velocities, the total measurement cycle time can be minimized.

Reducing the connector (stage) velocity just before contact prevents end face damage, while additional IL measurements in the compression phase help to reduce measurement variation. Connector velocities may also be changed as necessary within each of the three main phases, either dynamically or according to a fixed algorithm, to further optimize the measurement process. It is noted that the above method involves moving the reference connector 70R. One skilled in the art that system 10 can be configured so that the DUT connector 70D is moved, or so that connectors are moved.

As system 10 operates to move the reference and DUT connectors 70R and 70D closer together, the measured insertion loss $IL_M$ changes predictably with the changing gap distance d. If many measurements of $IL_M$ are made over time as the connector ferrules 90R and 90D approach each other at constant velocity, an IL curve can be constructed by plotting the measured insertion loss $IL_M$ against the known stage position $P_S$ in the z direction (i.e., $P_S(z)$). Extrapolation of the $IL_M$ curve toward stage positions $P_S$ corresponding to smaller gap separation distances d results in a prediction of the stage position $P_S(z)=P_C$ at which contact of the reference and DUT ferrule end faces 92R and 92D occurs, as described in the '133 application and the '954 application.

The most accurate estimates of the contact position $P_C$ arise from extrapolations of the $IL_M$ curve very close to the contact position $P_C$. To reduce total measurement time, the approach to the contact position $P_C$ can be broken up into several steps, where early stage steps are implemented at a high stage velocity $v_S$, resulting in rapid but relatively inaccurate predictions of the contact position $P_C$, while late-stage steps are implemented at a low stage velocity $v_S$, resulting in slow but accurate predictions of the contact position.

Figure 7A:
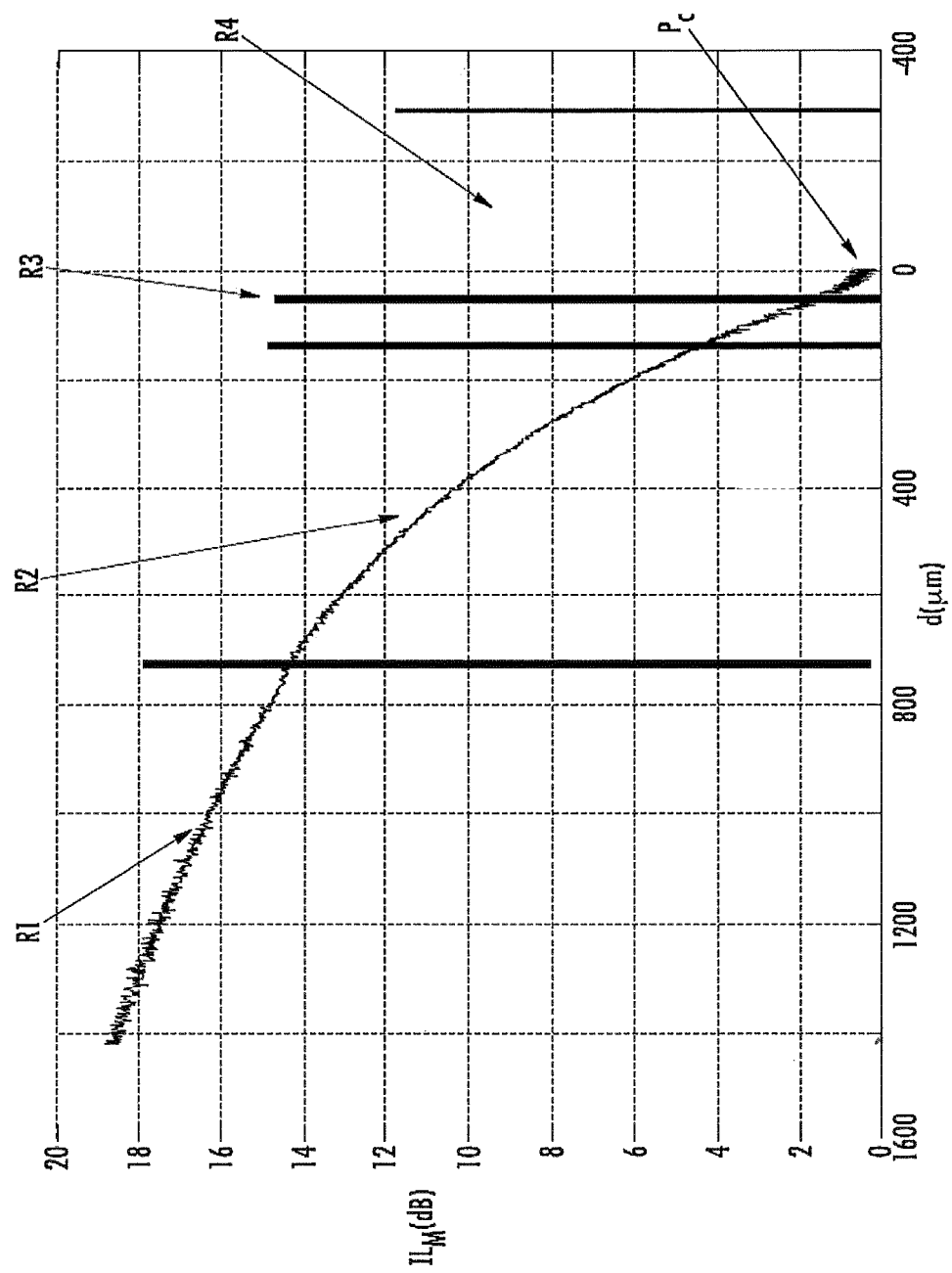
FIG. 7A is a plot of the raw measured insertion loss $IL_M$ (dB) versus gap distance d (µm) and illustrates four different regions of the plot that correspond to four different steps associated with determining the contact position $P_C$.

FIG. 7A is a plot of the raw measured insertion loss $IL_M$ (dB) versus gap distance d (μm) and illustrates an example of four different regions of the plot that correspond to four different steps associated with determining the contact position $P_C$. The first region is denoted R1 and is associated with a first step 1 wherein the initial connector velocity $v_A$ in the approach phase is in the range from 1 to 5 mm/s. The second region is denoted R2 and is associated with a second step 2, which is still in the approach phase, and wherein the connector velocity $v_A$ is in the range from 100 to 500 μm/s and provides a coarse estimate of contact position $P_C$. The third region is denoted R3 and is associated with a third step 3, which is associated with the contact phase and has a velocity $v_C$ in one example in the range from 10 to 50 μm/s and provides a fine estimate of the contact position $P_C$ while the gap distance d is about 60 μm to about 200 μm or in some cases 150 μm. The fourth region is denoted R4 and is associated with a fourth step 4, which is associated with the contact and compression phases and have a velocity $v_C$ or $v_{COMP}$ in the range from 10 to 50 μm/s. The region 4 of step 4 corresponds to a very accurate prediction of the insertion loss IL at the contact position $P_C$.

Figure 7B:
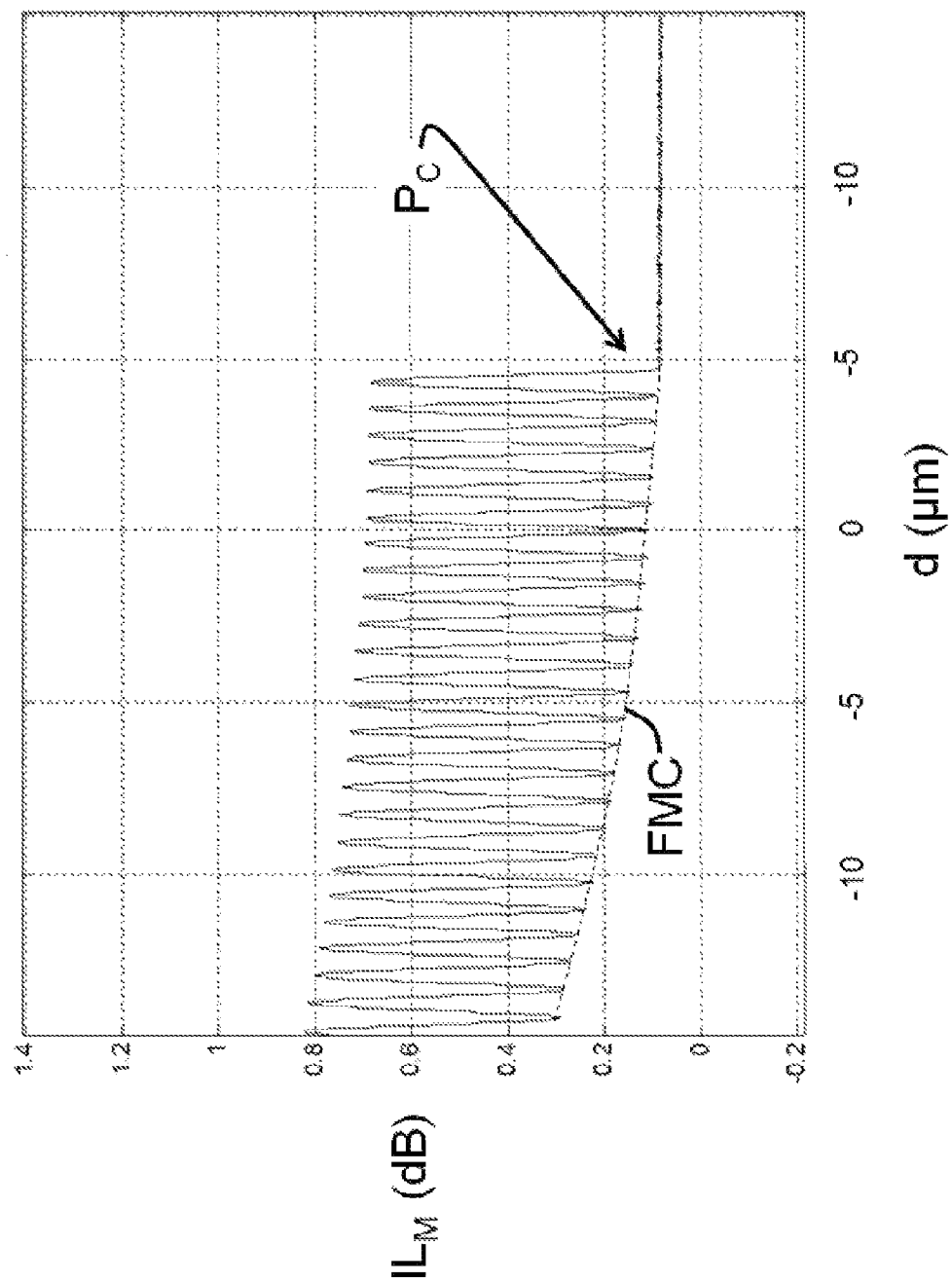
FIG. 7B is the same plot as FIG. 7A, but showing a close-up of the region around the contact position $P_C$ to shown the fringes in the plot.

The measured data points in region R3 reveal interference fringes due to resonant cavity effects produced by back-reflections between closely spaced ferrule end faces 92R and 92D. FIG. 7B is the same plot as FIG. 7A but shows a close-up of the region around the contact position $P_C$ to show the fringes in the plot. A fringe minima curve FMC (dashed line) is produced by fitting a curve through the fringe minima. Note in this case that the fringes end at about d=−4.5 μm, which indicates a small error in the estimation of the contact position $P_C$. This error is well within tolerance since a point $P_{CC}$ associated with a controlled contact compression ("controlled contact compression point" $P_{CC}$) that can extend to 10 μm to 100 μm or more due to the compression of resilient members 100R and 100D in the reference and DUT connectors 70R and 70D. It should be noted that the nature and amplitude of the fringes can vary depending on the type of connectors mated, ie SM,MM,UPC or APC. But in the majority of the cases fringes or fringe-like patterns can be detected and utilized in contact position estimation. Some specific cases are illustrated in below.

The IL Slope Method

Another method for estimating a near-contact condition of reference and DUT ferrules 90R and 90D involves examining the slope of the $IL_M$ curve created by plotting $IL_M$ vs. stage position PS(z), as described in the '133 application. An advantage of the IL slope approach is that it is invariant to IL curve shifts that arise due to various losses in the measurement system or connector jumper optical fiber links.

Figure 8:
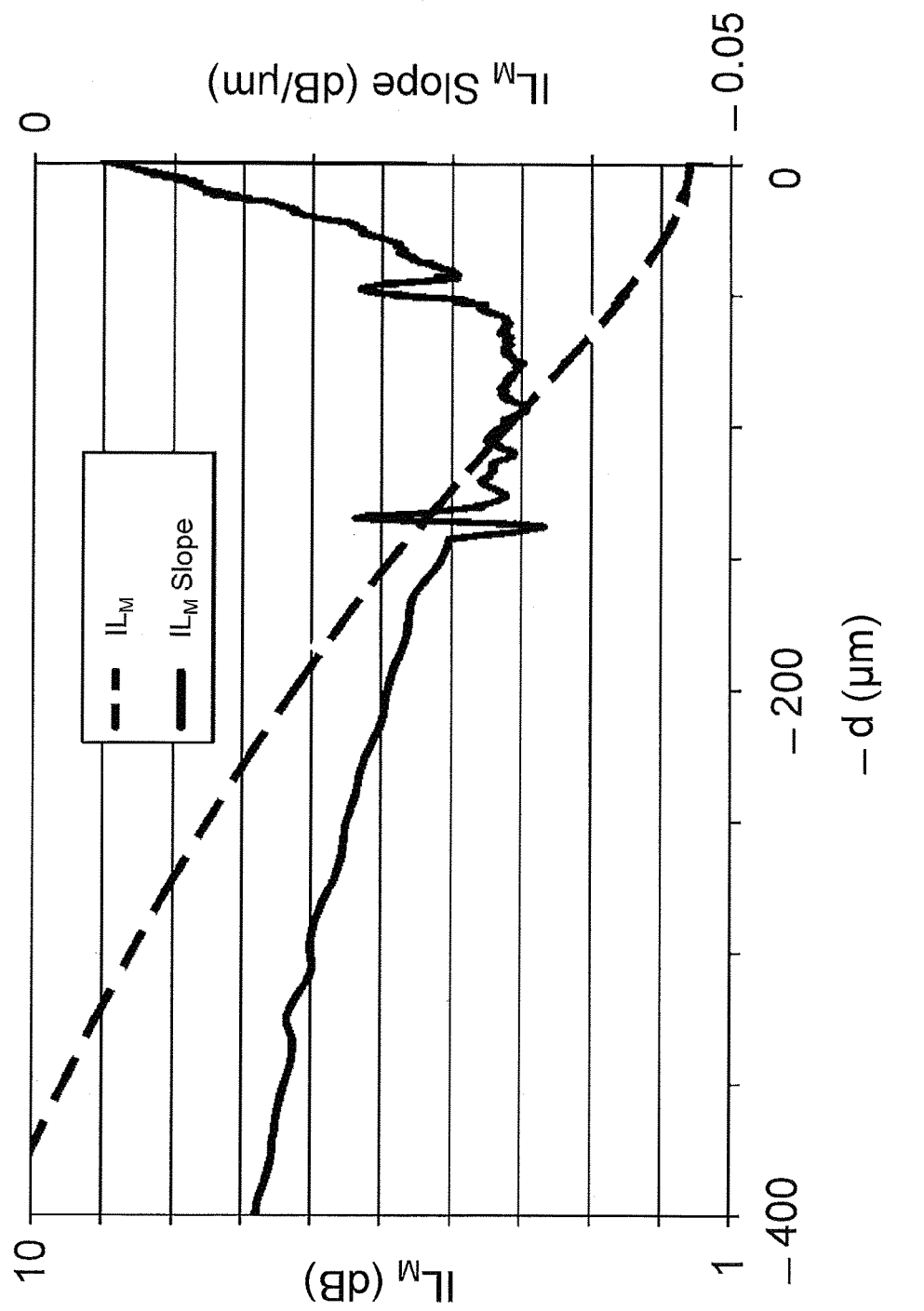
FIG. 8 plots both the measured insertion loss $IL_M$ (dB) (dashed line, right vertical axis) and the slope of the measured insertion loss $IL_M$ (solid line, left vertical axis) versus the negative of the gap distance, i.e., −d (µm)

FIG. 8 is plots both the measured insertion loss $IL_M$ (dB) (dashed line, right vertical axis) and the IL slope (solid line, left vertical axis) versus the negative of the gap distance, i.e., −d (μm). The measured insertion loss curve is based on the minima in the fringe pattern. The range of the gap distance d is 0 to 400 μm. The IL slope curve grows more and more negative moving toward contact at −d=0, until its maximum negative slope value is reached around 75 μm from contact. As the connector ferrules 90R and 90D are moved closer to contact, the slope of the IL curve becomes less negative predictably. Ripples visible in the IL slope curve correspond to distortions in the IL curve arising from changes in the stage velocity $v_S$. In practice, these ripples can be eliminated via digital filtering or by only utilizing IL slope data over specific ranges of the gap distance d (e.g., ranges where the stage velocity $v_S$ is constant).

An estimate of the contact position $P_C$ can be made by extrapolating the IL slope curve to d=0, which results in a slight overestimate of the contact position that can be adjusted. Alternatively, a near-contact position $P'_C$ can be determined by selecting a threshold IL slope value, such as −0.01 dB/μm. Once this value is reached, stage motion can be terminated or set to the velocity value required for the next measurement phase.

Figure 9A:
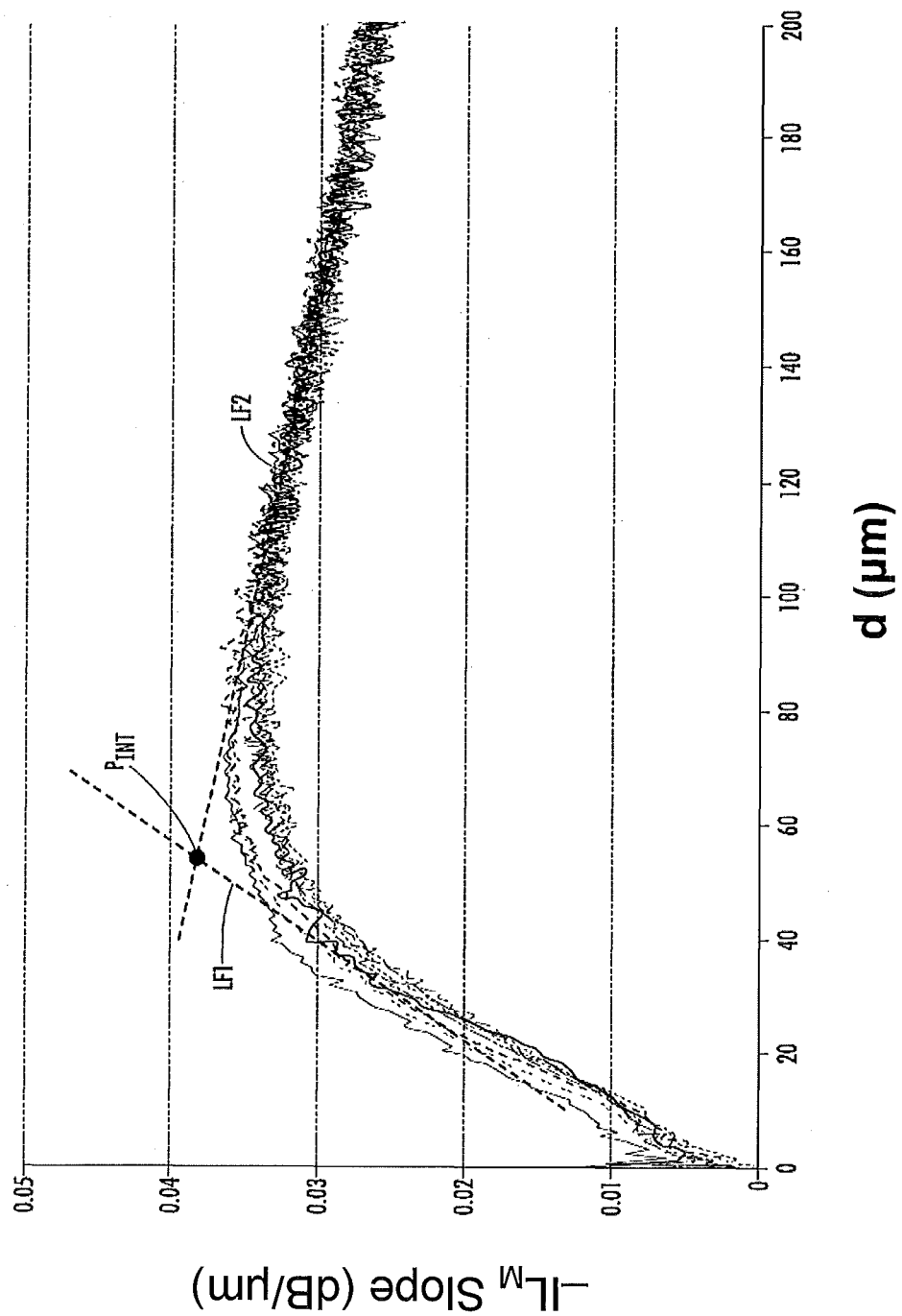
FIG. 9A is a plot of the negative (−) $IL_M$ slope (dB/µm) vs. gap distance d (µm) for eleven near-contact IL measurements taken over a gap distance d from 0 to 200 µm, and also showing the determination of an intercept point $P_{INT}$ used to gauge the gap distance d.

FIG. 9A is a plot of the negative (−) IL slope (dB/μm) vs. gap distance d (μm) for eleven near-contact IL measurements $IL_M$ taken over a gap distance d from 0 to 200 μm. The measurements were carried out on the same pair of connectors using the measurement system of FIG. 1 and the same alignment member 200 in the form of a sleeve. Note that in this case the gap distance d is shown as a positive value, so that the −IL slope curve appears to the right of the origin as compared to the plot of FIG. 8. The various curves in the plot of FIG. 9A show that the IL slope is very repeatable run to run, with each curve providing a peak value at a gap distance d of between 70 μm and 80 μm.

To the left and right of the peak value, the curves provide roughly linear regions where the slope of the IL slope (the IL concavity) is approximately constant. A linear fit can be made to these two regions, as shown by the two dashed lines LF1 and LF2. These lines can be extrapolated so that they intercept at a point $P_{INT}$. As shown in the plot, the location of the intercept point $P_{INT}$ is approximately the same for all measurement runs, at around 55 μm. This gap position at the intercept point $P_{INT}$ can be used as a virtual datum to gauge the gap distance d to ferrule contact during the approach phase.

Distributions of connector fiber core to ferrule misalignment will cause mated fibers to experience some degree of lateral offset at contact, as illustrated in the plot of FIG. 17 of the '133 application. This lateral misalignment alters the expected shape of the IL curve as the gap distance d between reference and DUT ferrule end faces 92R and 92D is reduced. The expected value of IL at contact also changes based on the degree of lateral misalignment.

Figure 9B:
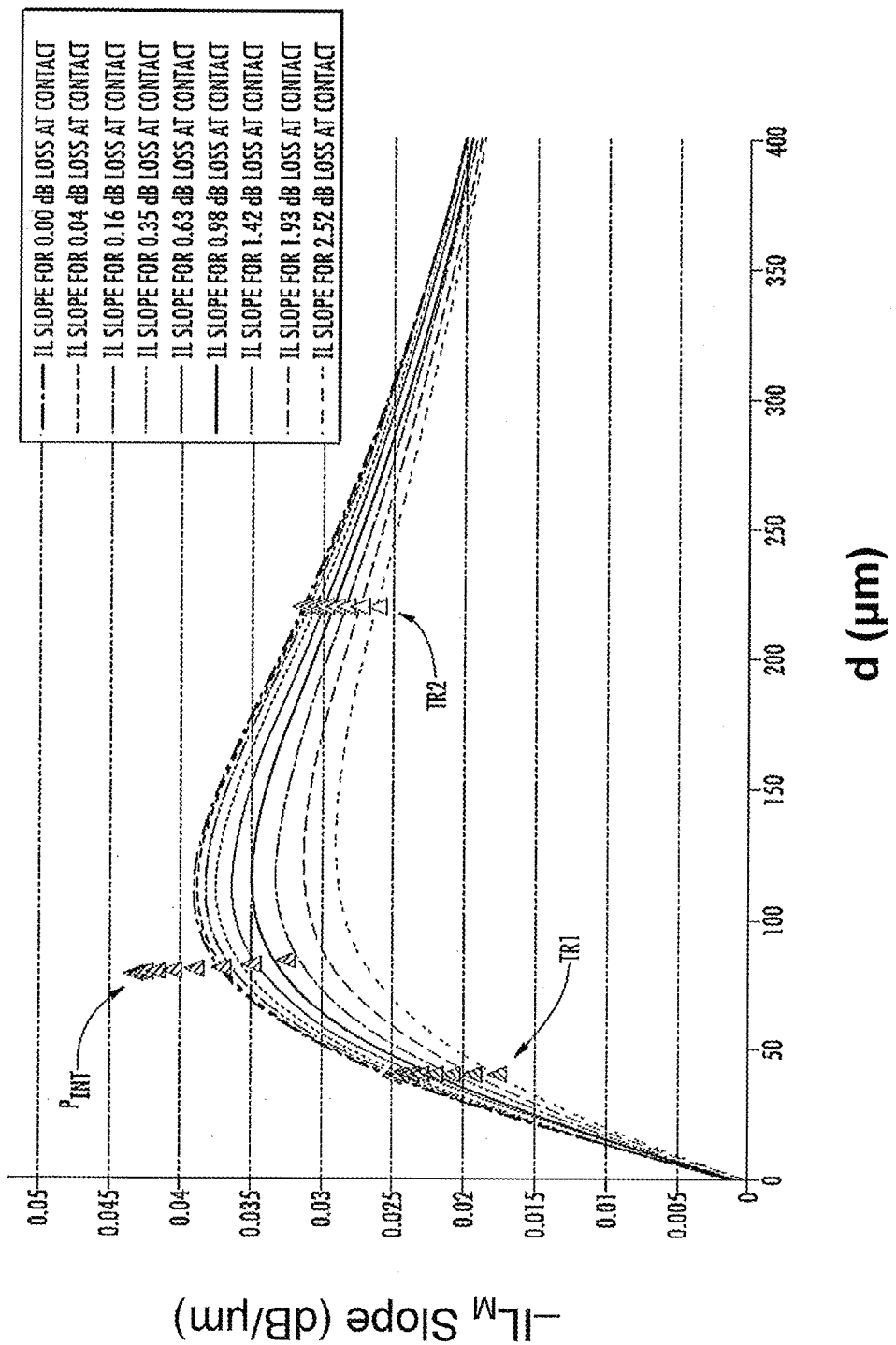
FIG. 9B is the same plot as FIG. 9A, but is based on modeled IL date, with the modeled data exhibiting similar features to those of FIG. 9A.

The IL slope curve can be calculated from simulated IL curves instead of the actual measured insertion loss $IL_M$. FIG. 9B shows is the same plot as FIG. 9A but based on modeled IL date. The curves of FIG. 9B exhibit similar features to those of FIG. 9A, including maximum values in a region around 100 μm from the contact position $P_C$ at d=0 μm, and downward sloping values moving closer to contact (to the left) and away from contact (to the right).

Since the IL curve shape varies as a function of fiber-to-fiber lateral misalignment, slightly different IL slope curves are also produced. A concern is that the linear interpolation approach shown in FIG. 9A to determine intercept point $P_{INT}$ will result in significantly different predictions of gap distance d for various intercept points generated by connector pairs with different degrees of lateral misalignment.

The plot of FIG. 9B provides calculated values for the intercept points $P_{INT}$ (shown as the middle triangles) based on the linear interpolation through selected points on the IL slope section close to contact (left set of triangles TR1) and away from contact (right set of triangles TR2). Results of the intercept point calculations show that the predicted gap distance d for the various intercept points does not vary by more than about 5 μm. This places an acceptable upper limit on the uncertainty in the location of the virtual datum point away from contact using this method.

APC Fiber Near-Contact Estimation

APC connectors have ferrule ends 92 that are angled. Such connectors are used to prevent unwanted reflections at fiber end face glass-air interfaces from coupling back into source connector fibers. As described the '133 application, both measurements and simulations of optical coupling between coaxially aligned APC connector ferrules at various separation distances confirm that:

1. Far from contact, the IL curve drops off more quickly with gap separation than UPC (flat polished) connectors.
2. The IL curve far from contact is free of interference fringes, indicating that contributions from light back reflected off the angled fiber interface is minimal
3. Fringes appear suddenly as the APC connector ferrules approach a near-contact position (20-30 μm separation), with a gradual increase in fringe amplitude until the ferrule end faces make contact.
4. Near-contact IL curve fringe minima trace out a parabolic form with gap distance, similar to what is observed in coupling of UPC connectors near-contact.

Figure 10:
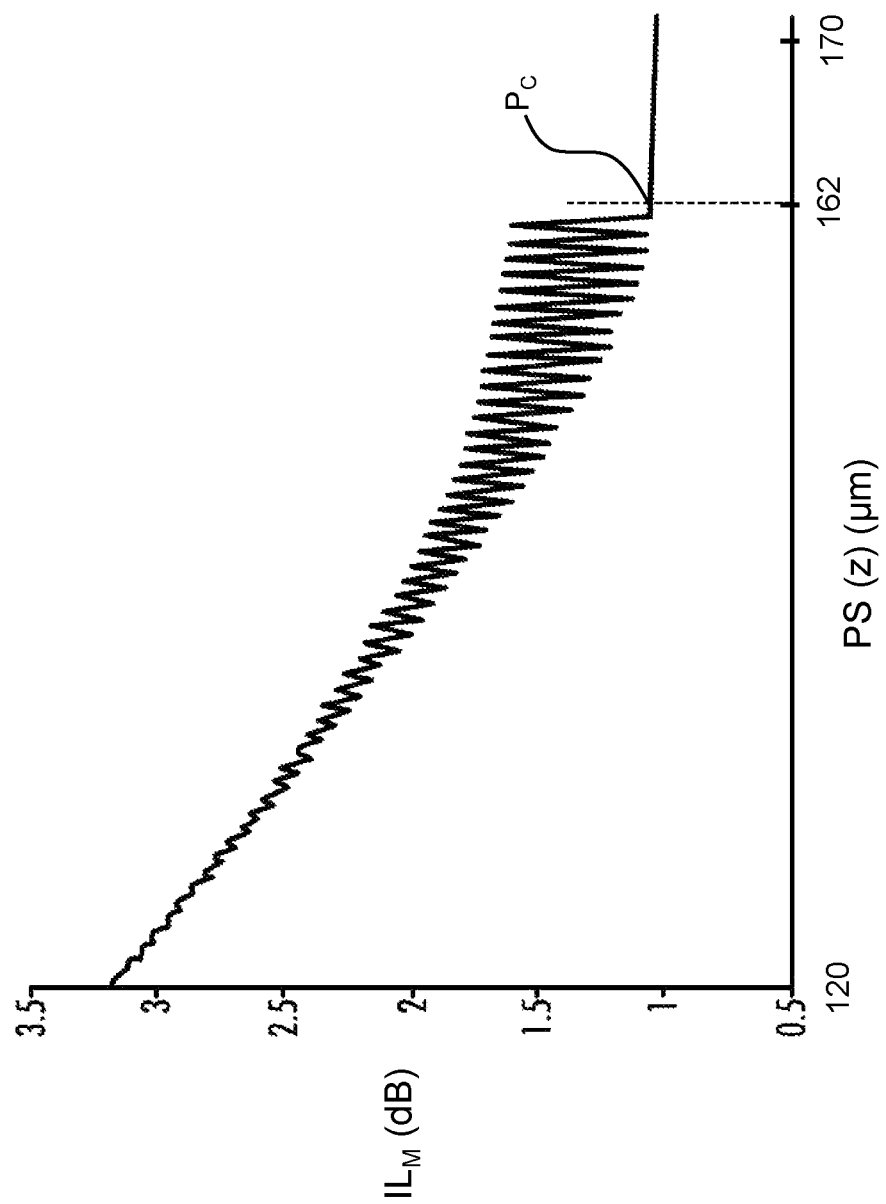
FIG. 10 is plot of the measured insertion loss $IL_M$ (dB) versus stage position PS (µm) for experimental results for optical coupling between APC connectors at various gap distances d.

FIG. 10 is plot of the measured insertion loss $IL_M$ (dB) versus the stage position PS(z) (μm) for experimental results for optical coupling between APC connectors at various gap distances d. In FIG. 10, contact occurs at a stage position PS of about PS=162 μm. As described above, at gap distances d greater than 30 μm interference fringes are barely visible on the measured IL curve.

The appearance of fringes, with detectable amplitude, when close to contact can be used as a trigger to indicate that a near-contact condition has been reached. The trigger can occur when the amplitude of the fringes reaches a fixed amount, or when the rate of fringe growth reaches a target value. Based on previous measurements, a trigger event can be correlated to a specific gap distance from contact, so that the approach phase terminates with a known gap distance d between reference and DUT connector ferrules ends 92R and 92D.

Since the IL curve minima points form a parabolic curve close to contact, extrapolation techniques for the IL curve minima can be used for APC connectors to predict the stage position PS(z)=$P_C$ where contact will occur.

Multimode Fiber Near-Contact Estimation

Multimode fibers carry light in many different modes that propagate at different velocities. As a result, when light is coupled at a large gap distance d between coaxially aligned UPC connectors with multimode, the resulting contributions from interference fringes from the various modes tend to cancel each other out. Therefore, at large gap distances d, the IL curve is generally free of any fringe effects.

When the fiber ends 65R and 65D are brought into close proximity, the similar optical path length associated with all modes results in the sudden appearance of interference fringes. These fringes are visible both in measurements made on multimode fibers and in simulations, as described in the '133 application.

Figure 11B:
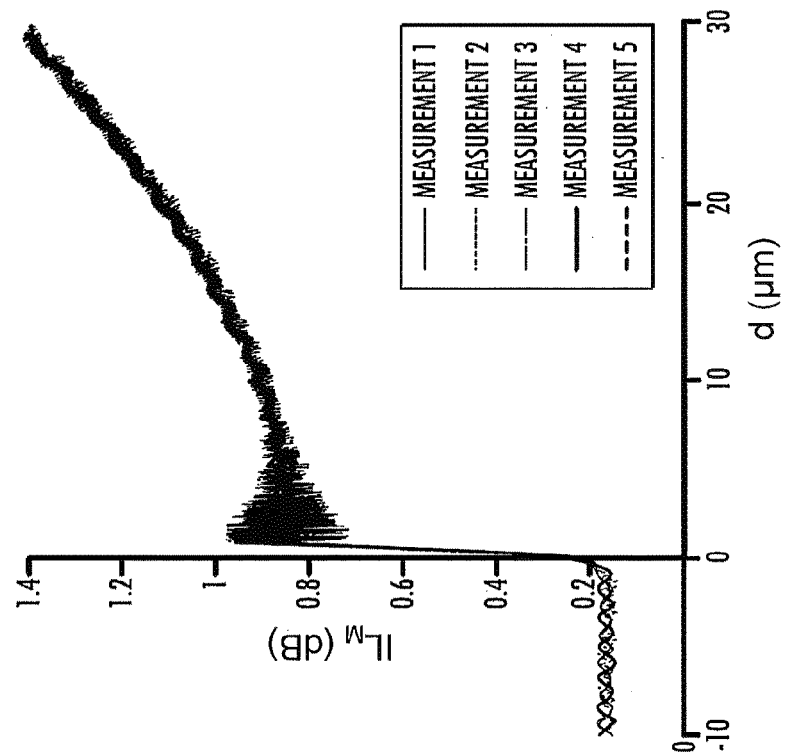
FIGS. 11A and 11B are plots of the measured insertion loss $IL_M$ (dB) versus the gap distance d (µm) for relatively large gap distances (FIG. 11A) and relatively small gap distances (FIG. 11B) for five different measurements of multimode-fiber DUT connectors.
Figure 11A:
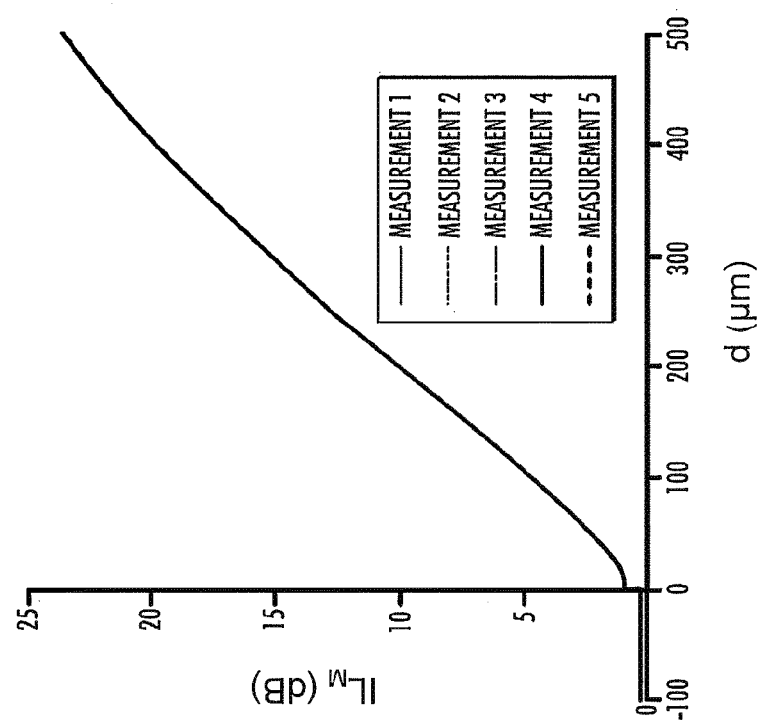

FIGS. 11A and 11B are plots of the measured insertion loss $IL_M$ (dB) versus the gap distance d (μm) for relatively large gap distances (FIG. 11A) and relatively small gap distances (FIG. 11B) for five different measurements of multimode-fiber DUT connectors 70D. Fringes appear suddenly at a gap distance d in the range from 5 μm to 7 μm, while the IL curve drops by about 0.8 dB immediately before contact.

Both the appearance of fringes near-contact and the sudden drop in the measured insertion loss $IL_M$ can be used to provide feedback for when multimode fibers are approaching near-contact conditions. Features from the distinct shape of the measured insertion loss $IL_M$ far from contact can also be used to predict when contact will occur, using the methods described above.

Optical Determination of Near-Contact Condition

As illustrated in FIG. 3A, if alignment member 200 is transparent or translucent, then PMS 300 can be used to view the position of reference and DUT ferrules 90R and 90D within the alignment member. In another example, PMS can be used to view the position of reference and DUT ferrules 90R and 90D within the alignment member 200 when the alignment member is opaque but has a slot 206 through which the ferrules can be viewed.

In another example, light can be launched into gap G and the light that passes through the gap can be detected to provide an estimate of the gap distance d.

In another embodiment, system 10 of FIG. 5 can be used wherein PMS 300 views the reference and DUT ferrules 90R and 90D directly without alignment member 200 present.

The Contact Phase

Once the reference and DUT ferrule end faces 92R and 92D are separated by a small gap (e.g., 15-20 μm or smaller), the velocity $v_S$ of stage 80 (and thus the connector velocity v) is reduced. It is desirable that the gap distance d be as small as possible to reduce the amount of measurement time that must be dedicated to the contact phase. This is particularly important because the stage velocity $v_S$ (or reference-connector velocity v) in the contact phase is relative low, so even small gap distances may require considerable amounts of time to traverse. Techniques that enable precise estimation of the contact position $P_C$ are therefore important for meeting measurement cycle time requirements.

During the contact phase, in an example the selected stage velocity $v_S$ and attendant reference-connector velocity v must simultaneously meet three main requirements:
1. It must be low enough to prevent (or significantly reduce) impact damage on the reference fiber end face 65R over many (e.g., >1000) measurement cycles.
2. It must be high enough to allow the measurement system 10 to meet cycle time targets.
3. It must be high enough to overcome undesirable static friction effects between the ferrule and alignment member when using passive alignment member 200.

Based on these requirements, the contact-phase velocity $v_C$ of reference connector 70R can in different examples be in the following ranges: In a first example, $5 \ \mu m/s \le v_C \le 500 \ \mu m/s$; in a second example, $10 \ \mu m \le v_C \le 100 \ \mu m/s$; in a third example, $10 \ \mu m/s \le v_C$ to $50 \ \mu m/s$; and in a fourth example, $20 \ \mu m/s \le v_C$ to $30 \ \mu m/s$.

In the contact phase, the IL measurements are made continuously as the reference and DUT ferrule end faces 92R and 92D move toward contact. Experiments show that all connector types currently under consideration (UPC, APC, single-mode, multimode) exhibit detectable interference fringes immediately before contact. At end-face contact, the rapid oscillations in the measured insertion loss $IL_M$ cease. This point marks the end of the contact phase, and the method moves on to the compression phase. Identification of the cessation of fringes gives a precise identification of the actual contact point $P_C$, and can be used to ensure a precise amount of compression in the controlled-contact measurements.

Low Contact Velocity

Experiments on mating of connector ferrules within commercial adapters show that the connector (or ferrule) velocity at contact is conventionally 1 to 3 mm/s (i.e., 1000 µm/s to 3000 µm/s). Observation of connector fiber end faces after as few as ten in adapter mate-demate (connection/de-connection) cycles reveals damage and debris, even after periodic cleaning of fiber end faces.

An aspect of the method disclosed herein includes making contact with the reference and DUT ferrules 90R and 90D at considerably lower velocities, e.g., 20-30 µm/s. This serves to prevent damage to the fiber end faces 65R and 65D by minimizing the amount of energy available for driving hard debris particles into the fiber end faces. A low contact velocity is also expected to reduce the ability of soft debris particles from deforming and adhering firmly to the fiber end faces 65R and 65D. This simplifies the fiber end-face cleaning process when debris inadvertently impacts the fiber end face.

In an example, the contact velocity $v_C$ is 50 to 100 times lower than the above-identified conventional velocity used when mating commercial connector adapters. If contact is made at extremely low velocities (e.g., 3 µm/s), the controlled contact velocity can be 333 to 1000 times lower than that used in commercial connectors/adapters.

IL Measurement Time

For manufacturing applications, total measurement time becomes a significant factor in the connector cost. With the flexibility offered by this controlled contact method the total measurement time can be minimized, while ensuring the maximum benefit of the controlled contact measurement method. As an illustration, estimated times for various process steps are given below:
1. Approach phase: 5 seconds, for traversing the 5 mm distance between the DUT connector ferrule loading position and contact with the reference connector ferrule, at a maximum approach velocity of $v_A$=1 mm/s.
2. Compression phase: 1 second, for traversing up to 1 mm distance between the DUT/reference ferrule contact and full compression, at a maximum approach velocity $V_{COMP}$ Of 1 mm/s.
3. Retraction phase: 1 second, for traversing the 6 mm distance between the DUT connector ferrule loading position and contact with the reference connector ferrule, at a maximum approach velocity of 6 mm/s.

This leaves about three seconds to complete the contact phase. Assuming that the contact phase involves slow traversal across a 60 µm gap, the minimum average contact velocity to meet the cycle time requirement is $v_C \approx 20 \ \mu m/s$.

It is possible to modify the contact velocity $v_C$ during the contact phase so that it is considerably higher during the first portion of the contact phase (e.g., $v_C$=100 µm/s) and much lower during the final portion of the contact phase when contact occurs (e.g., $v_C$=3 µm/s).

High Velocity to Overcome Static Friction

Experiments show that at relatively low stage velocities $v_S$, friction between the reference ferrule 90R and alignment member (sleeve) 200 can induce sudden changes in the ferrule velocity within the sleeve. For example, ferrule-sleeve friction at low velocities can cause ferrule motion to slow or stop, and then suddenly accelerate as connector resilient member compression forces overcome the ferrule-sleeve static friction limit.

To avoid this sleeve gripping and slipping, stage velocities $v_S$ are typically required to be in excess of 1-3 µm/s. Another alternative to eliminate any static friction effects from the ferrule/sleeve interaction is to use the active alignment method enabled by system 10 of FIG. 5.

Compression Phase

After reference and DUT ferrules 90R and 90D make contact, continued motion of stage 80 causes one or both connector resilient members 100R and 100D to be compressed so that the force applied at the reference and DUT fiber end faces 65R and 65D increases. System 10 can be configured so that stage motion and IL measurements stop under a variety of conditions, including for example:
1. Stop measurement just after fiber contact.
2. Stop measurement at compression level where IL measurements stabilize.
3. Stop measurement at a predefined compression distance or pressure.
4. Stop measurement when connectors are compressed to mimic mating in an adapter.
5. Stop measurement dynamically based on combination of IL value, compression distance and pressure.

In the simplest option for the compression phase, the stage motion and the IL measurements can be terminated immediately after contact is detected. This results in the shortest measurement cycle, and measurements on SC connectors show that in about 50% of all measurement cases the IL value immediately after contact is identical to values obtained after considerable continuing stage motion, to within approximately a 0.02 dB measurement uncertainty of system 10.

To reduce measurement uncertainty of IL values measured immediately after contact, the motion of stage 80 can continue for distances beyond contact $d_{BC}$ of 10 to 50 µm. This allows multiple IL measurements to be obtained. The stage velocity $v_S$ over this short distance beyond contact can be increased to a larger value (e.g., $V_{amp}$ of 100 to 500 µm/s) to minimize total measurement cycle time.

Experiments show that in about 50% of all cases there is a slight downward drift in measured IL as stage motion continues beyond contact. While the change in IL is generally small (e.g., 0.02-0.03 dB), eliminating this measurement error helps improve the accuracy of the IL measurement. Analysis of experimental results using multiple connectors indicates that a compression distance (i.e., $d_{BC}$) of about 400 µm is required to eliminate the drift in the insertion loss measurement. Stage motion beyond this compression level resulted in stable IL measurements, within the measurement uncertainty of the measurement equipment used in system 10. As discussed above, stage motion during continued compression can be made at a relatively high stage velocity $v_S$ to minimize total measurement time.

It may be desirable to define a target compression distance significantly above the distance where the IL measurements stabilize, to guard against connector outliers that yield considerable IL drift during compression. Alternatively, the connector support hardware can be modified to include integral measurement of connector ferrule axial strain during the compression phase. Using this strain measurement, the measurement system can be programmed to terminate compression phase IL measurements when the connector ferrule axial compression exceeds a target value.

The stage motion during continued compression can be carried out under constant velocity, or it can be modified so that stage velocity $v_S$ is high during initial low ferrule compression force levels, and low during higher compression force levels. This latter approach allows the total measurement time to be minimized.

An extension of the previously described approach is to characterize the ferrule compression distance and/or ferrule axial compression force in connectors mated in commercial adapters, and then to use similar threshold values to determine when compression phase stage motion should terminate. For example, examination of the CAD design for SC-UPC connectors and adapters indicates that the total compression distance for both connector ferrules is expected to be about 1060 µm. In practice, the compression experienced by each connector ferrule may be equal (e.g., each ferrule is compressed by 530 µm) so that the two connector ferrules make contact in the exact center of the adapter. Due to static friction effects, it is more likely that that one connector ferrule will compressed by more than 530 µm, while the second connector will be compressed by less than 530 µm, so that the total compression experienced by both connector ferrules is about 1060 µm.

System 10 may be designed to terminate stage motion in the compression phase based on one or more threshold conditions or any weighted combination of threshold conditions. In one example, the stage motion terminates a fixed distance beyond the compression point where the IL value stabilizes. The IL value stabilization can be determined by measuring the standard deviation of IL values over a fixed time or compression distance window, and flagging IL stabilization when the standard deviation drops below a pre-defined IL variation value.

The IL variation value can be selected to be at least slightly greater than the typical IL variation due to measurement noise, but considerably smaller than typical IL variation due to IL drift on connector ferrule compression. Alternatively, the IL variation value can be determined by other methods, such as the maximum IL value minus the minimum IL value measured over a fixed time or compression distance window.

In another example similar to that above, stage motion terminates at a fixed increment of compression pressure beyond the compression pressure at which the IL value stabilizes.

In another example similar to those above, a log is maintained of the N most recent IL measurements and the compression distances where stage motion terminates, so that stage motion for the current IL measurement terminates at the compression distance determined by methods described above, or at a compression distance that is the average or maximum of the N recent measurements.

In yet another example similar to those above, the stage motion terminates when the IL value stabilizes and the compression distance and/or pressure meets a predefined target value.

The system 10 can also be configured to flag connectors where the IL value does not stabilize even after reaching a threshold compression distance and/or pressure. The connector can be re-measured or removed for cleaning or examination.

Retraction and Removal

After completion of the compression phase, the DUT connector ferrule 90D is removed from system 10. The DUT connector ferrule 90D is then passed to the next connector processing step manually or via automatic handling. If system 10 determines that a repeat measurement is required, the DUT connector ferrule 90D can be partially retracted before repeating the approach phase.

Controlled-contact Measurement Results

An R&R (Repeatability and Reproducibility) study was performed to examine how the controlled-contact insertion loss measurement methods disclosed herein compared to the existing standard contact-based measurement approach, as well as the recently developed near-contact IL (NCIL) measurement approach. The study used the same set of twelve connectors and characterized them multiple times using the three difference measurement methods. The controlled-contact measurement method used a constant compression distance of 300 µm beyond contact, and a reference-connector velocity of 30 µm/s through the contact and compression phases.

Figure 12B:
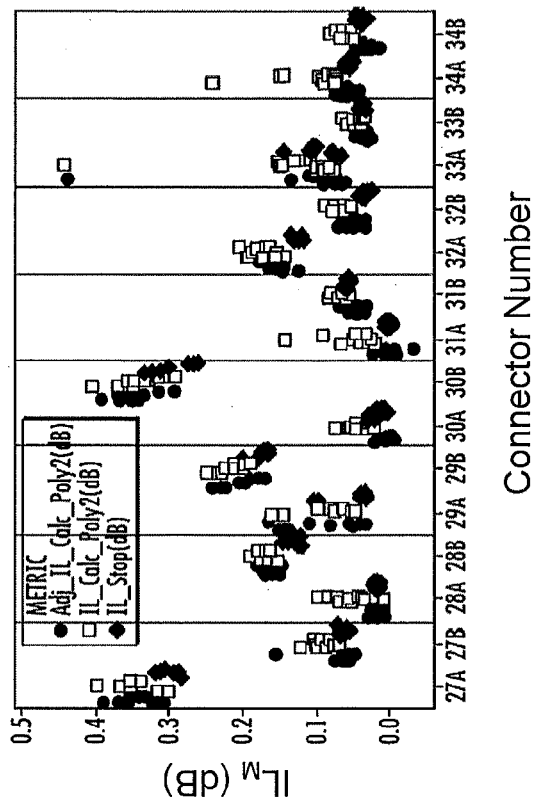
FIGS. 12A and 12B are plots of the measured insertion loss $IL_M$ (dB) versus connector number to define control charts that compare IL measurements obtained using the controlled-contact method disclosed herein to the standard IL method (FIG. 12A) and that show the results of the repeatability and reproducibility (R&R) study (FIG. 12B) as discussed below.
Figure 12A:
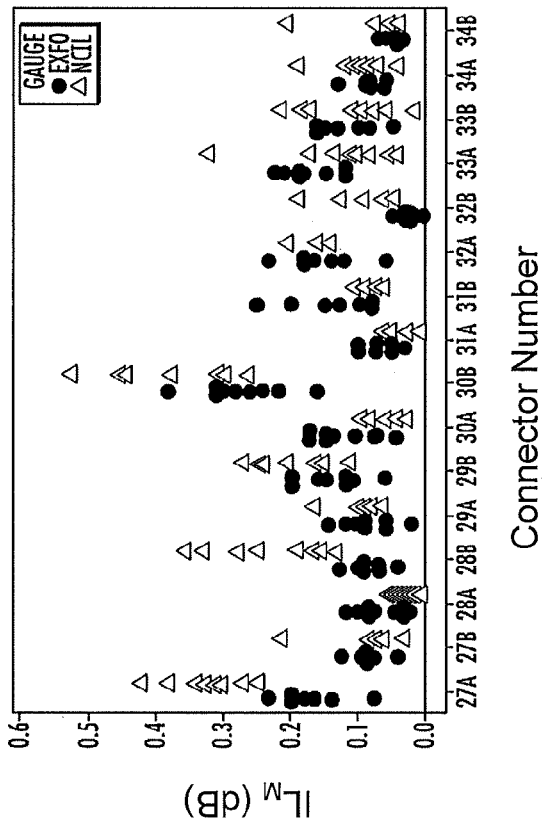

Results of the R&R study are summarized below:
1. Controlled contact IL measurement R&R value: 0.02 dB
2. Standard contact-based IL measurement R&R value: 0.04 dB
3. Near-contact IL measurement R&R value: 0.06 dB Control charts comparing measurements obtained using the controlled-contact method and the standard IL method are shown in FIG. 12A, while the results of the R&R study are shown in FIG. 12B. Both FIGS. 12A and 12B plot the measurement insertion loss $IL_M$ (dB) versus sample (connector) number. The Tables below set forth control charts showing the controlled-contact IL measurement data versus the standard IL measurement data.

| | Source | Estimated Variance | % of Total Variance | One StDev | p-value |
|---|---|---|---|---|---|
| | CCIL Sleeve 26 (controlled contact) | | | | |
| 1 | Connector | 0.00854 | 97.48 | 0.092 | 0.000 |
| 2 | Reload | 0.00019 | 2.17 | 0.014 | 0.000 |
| 3 | Error | 0.00003 | 0.35 | 0.006 | |
| 4 | Total | 0.00876 | 100.00 | 0.094 | |
| | Repeatability | 0.00022 | 2.52 | 0.015 | |
| | Standard measurement | | | | |
| 1 | Connector | 0.00423 | 78.62 | 0.065 | 0.000 |
| 2 | Reload | 0.00115 | 21.34 | 0.034 | 0.000 |
| 3 | Error | 0.00000 | 0.04 | 0.001 | |

-continued

| Source | | Estimated Variance | % of Total Variance | One StDev | p-value |
|---|---|---|---|---|---|
| 4 | Total | 0.00538 | 100.00 | 0.073 | |
| | Repeatability | 0.00115 | 21.38 | 0.034 | |
| | | NCIL Sleeve 26 | | | |
| 1 | Connector | 0.01602 | 87.90 | 0.127 | 0.000 |
| 2 | Reload | 0.00184 | 10.09 | 0.043 | 0.000 |
| 3 | Error | 0.00037 | 2.02 | 0.019 | |
| 4 | Total | 0.01823 | 101.01 | 0.135 | |
| | Repeatability | 0.00221 | 12.11 | 0.047 | |

The measurement results show that the expected variation in the IL measurement using the controlled-contact method is lower than the existing standard method, as well as the near-contact IL measurement method. Both the controlled-contact method and the standard method involve direct contact of the reference and DUT fiber end faces 65R and 65D, and both leverage a ceramic sleeve 200 for passive alignment of DUT connector and reference connector ferrules 90R and 90D.

The two key differences between these approaches are: 1) the ferrule velocity v at contact: 30 μm/s for controlled contact IL approach vs. an estimated 1 to 3 mm/s for the standard approach; and 2) the ferrule compression distance beyond contact: 300 μm for controlled contact IL approach vs. estimated 1030 μm for the standard approach.

The larger variation in the near-contact IL measurement approach is partially expected, because the approach is incapable of predicting IL drift after contact. Also, the near-contact IL measurement R&R study was performed using contact prediction routines that have since been modified to reduce IL variation.

Measurement of Ferrule Velocity at Contact

A study was performed to measure the velocity of a DUT connector ferrule 90D as it is inserted into a commercial adapter. The experimental setup was identical to system 10 as used for controlled-contact IL measurements, except that the reference and DUT connector ferrules 90R and 90D were aligned in a ceramic sleeve 200 housed within a commercial adapter instead of a custom bench fixture, and that reference and DUT connectors 70R and 70D were manually inserted into the ceramic sleeve instead of being inserted via a computer-controlled motion stage.

The measurement system launched light into the reference connector 70R so that as the DUT connector ferrule 90D approached the reference connector ferrule, more and more light was coupled from the reference connector to the DUT connector. At large gap distances d, the relationship between measured IL and gap distance d was relatively insensitive to lateral and angular misalignments, so IL measurements can were directly correlated to the gap distance d between ferrule end faces 92R and 92D. At small ferrule gap distances d (e.g., <200 μm) strong back reflections off the DUT connector fiber end face 65D induced interference fringes due to a cavity etalon effect. The IL fringe minima appeared at gap distances d that were integer multiples of λ/2, where λ is the wavelength of light used in the measurement system. By measuring the time delay t between each detected IL fringe minima occurs, the ferrule velocity v was calculated as v=λ/2t Using these two techniques, the ferrule velocity v at contact was estimated for multiple connections using an adapter. First a reference connector 70R was fully inserted into one port of the adapter so that the connector trigger latch snapped into a mating recess in the adapter. Next the DUT connector 70D was inserted into the other port. The operator inserted the DUT connector 70D into the adapter with a manual insertion velocity that mimics the typical connection process used in the field. Using IL measurement data, the velocity of the DUT connector 70D was estimated at various gap distances d for four separate DUT insertions.

Figure 13:
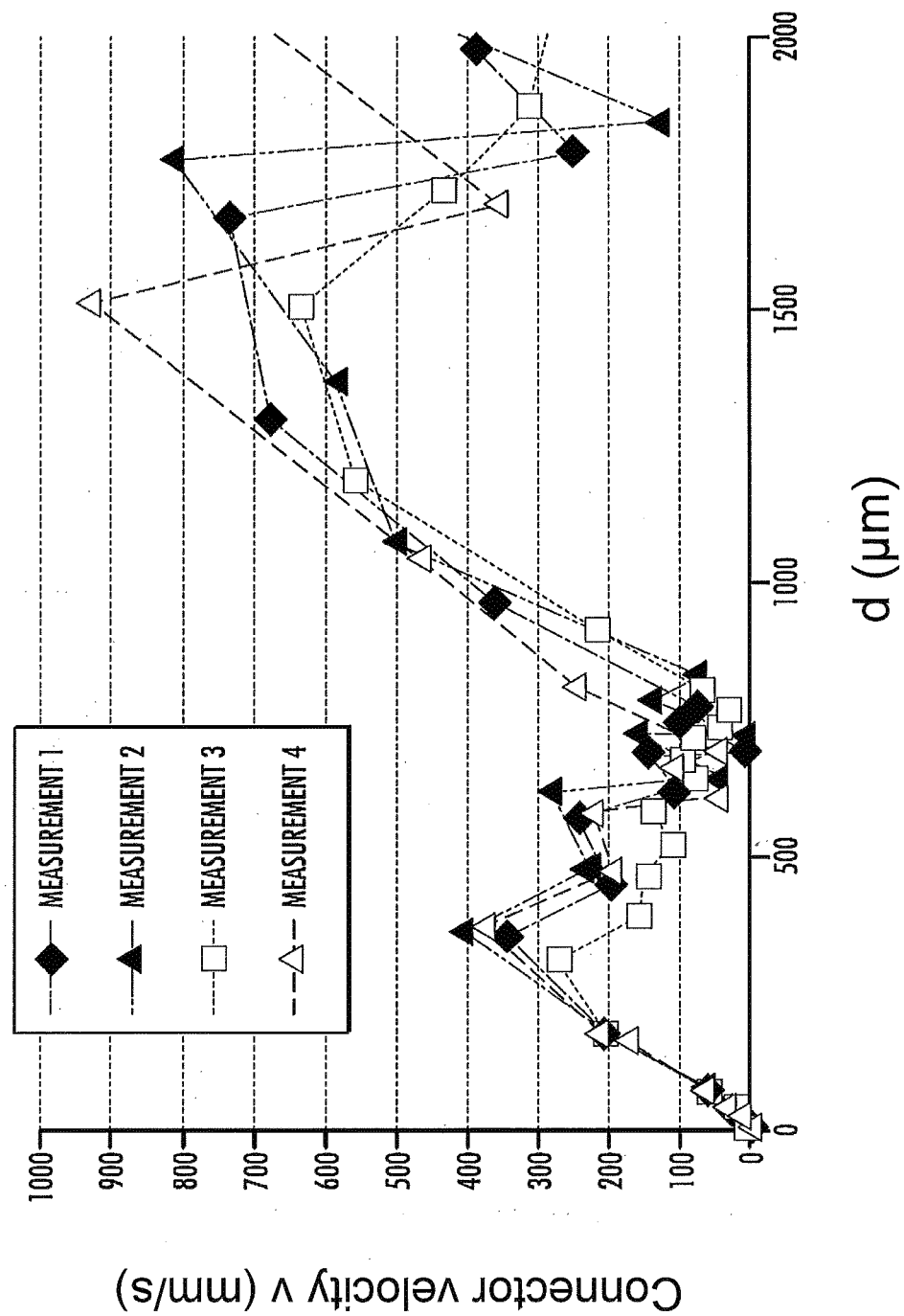
FIG. 13 plots the connector velocity v (mm/s) as a function of the gap distance d (µm)

FIG. 13 plots the connector velocity v (mm/s) as a function of the gap distance d (μm). A first observation is that the velocity curves for the four measurements appear very similar at distances <1500 μm away from contact (d=0). This similarity occurs in spite of expected variations in the way the operator inserted the DUT connector 70D into the adapter during each measurement trial. The characteristic shape of the velocity curve likely reflects mechanical interactions between connector and adapter components.

For example, velocity variations may arise due to resistance encountered by the DUT connector as the DUT connector angled trigger tab flexes and engages a mating recess in the adapter body or due to opposing gripping fingers internal to the adapter engage corresponding notches in the connector body.

The gripping fingers are designed to squeeze into the connector notches so that their squeezing action results in an axial reaction force in the connector body. This axial reaction force balances the force generated by the resilient members within the connectors, ensuring that a compression force between mated connector ferrules 90R and 90D is constantly maintained.

The velocity plot shows that ferrule approach velocities reach a maximum of 700-900 mm/s at a gap distance d of 1500-1800 μm. Moving closer to contact, the velocity v drops rapidly until a local minimum of 0-50 mm/s is reached 600-800 μm away from contact. As the connectors moved closer to contact their velocity increased again, reaching a local maximum velocity of 270-400 mm/s around 400 μm away from contact.

Figure 14A:
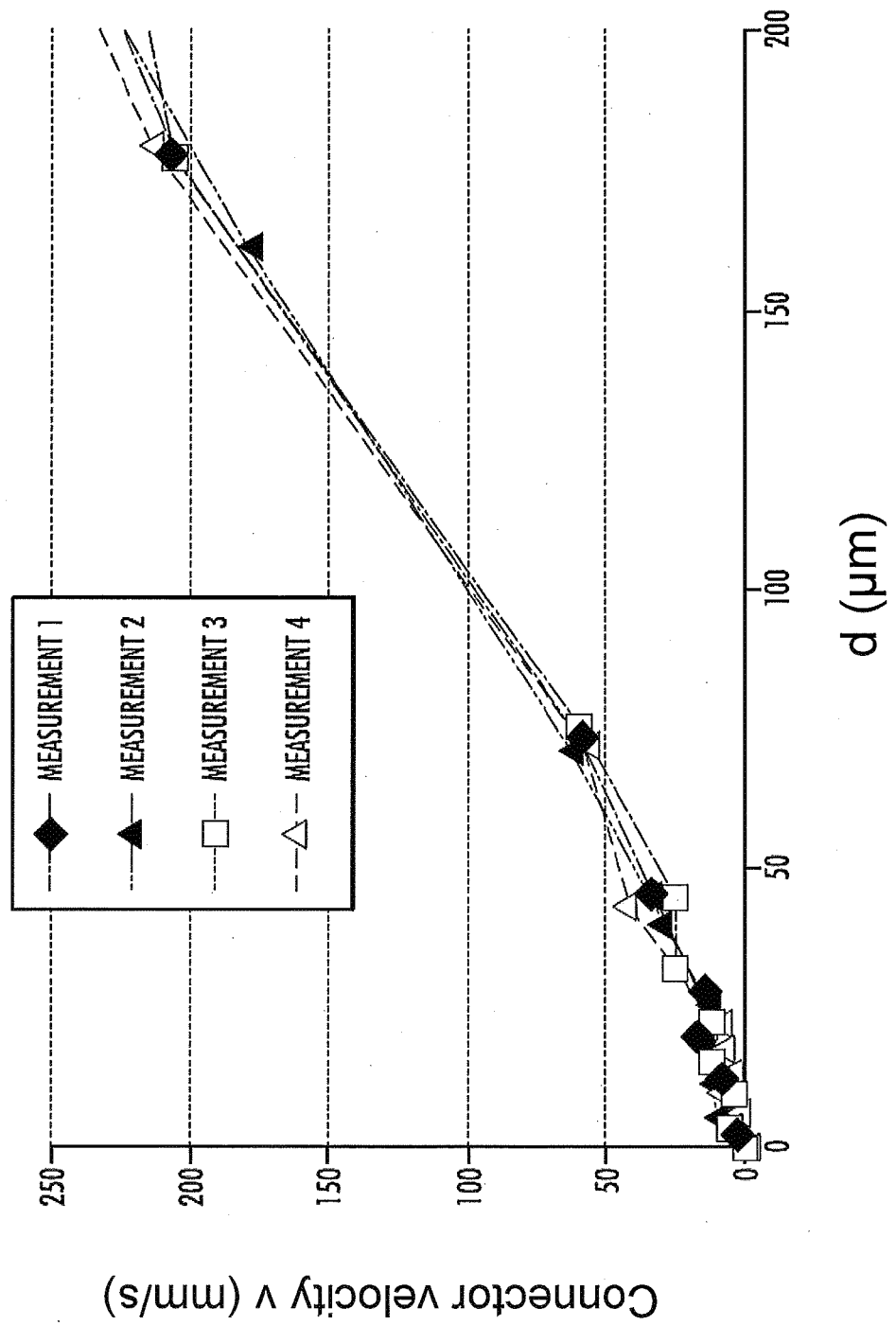
FIG. 14A same as the plot of FIG. 13, but for a smaller range of the gap distance d of 0 to 200 µm.

During the final approach to contact the velocity dropped linearly as the gap distance was reduced from 200 μm to 0 μm, as best seen in the plot of FIG. 14A, which is the same as the plot of FIG. 13 but for a smaller range of the gap distance d from 0 to 200 μm. This implies a constant deceleration in advance and anticipation of ferrule contact. The constant deceleration may be due to the damping action of air captured in the closing gap G between ferrule end faces 92R and 92D. The sleeve ferrule 200 allows air in the gap to escape, and since the ferrule end faces 92R and 92D are polished with a large radius, even at contact an air gap G exists over most of the ferrule end face area.

Figure 14B:
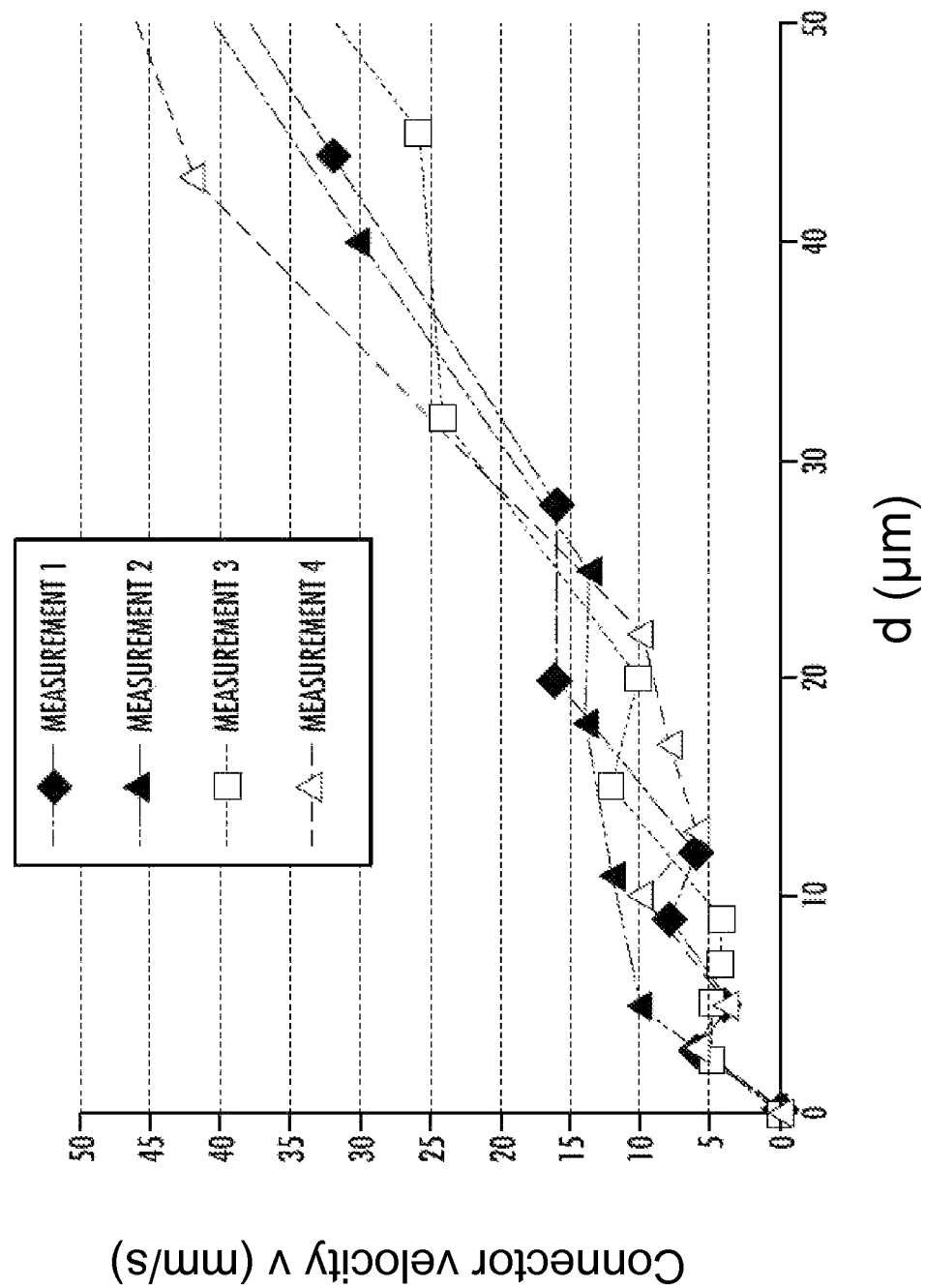
FIG. 14B is similar to FIG. 14A, but for an even smaller range of gap distance d of 0 to 50 µm.

FIG. 14B is similar to FIG. 14A, but for an even smaller range of gap distance d of 0 to 50 μm. In all measurement cases, immediately before contact the ferrule velocity v appears to be at least 3 to 5 mm/s. This ferrule velocity v is considerably higher than velocities (e.g., 20-30 μm/s) used in the controlled-contact IL measurement method Measurement of the IL Variation after Contact The controlled contact IL measurement method provides an advantage over the near-contact IL method in that the IL measurement includes potential IL variations that can occur after contact during the compression phase. Measurements of IL variation after contact were made on multiple connectors over a range of ferrule compression distances to assess the IL variations after contact has been made. The measurements provide guidance on recommended minimum compression distances required for minimizing IL variation after contact.

Figure 15A:
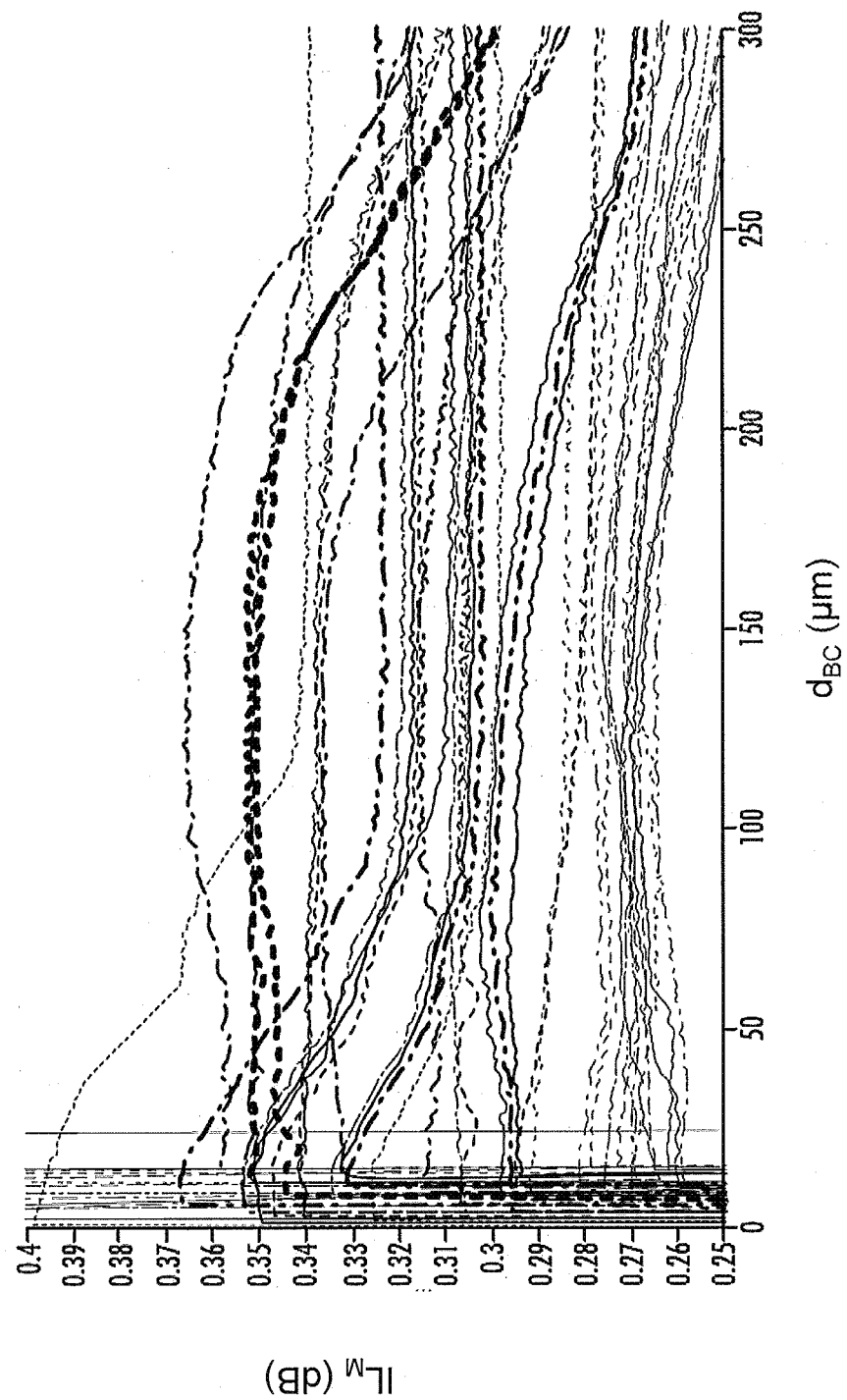
FIG. 15A is a plot of the measured insertion loss $IL_M$ (dB) versus the distance beyond contact $d_{BC}$ (µm) for 256 measurements involving the first 14 connectors.

In a first experiment, twenty different connectors were measured multiple times over values of the distance beyond contact $d_{BC}$ in the range from 0 to 300 μm. FIG. 15A is a plot of the measured insertion loss $IL_M$ (dB) versus the distance beyond contact $d_{BC}$ (μm) for 256 measurements involving the first 14 connectors. Measurement noise was reduced by averaging raw data around each integer μm increment of compression distance. For example, IL data points shown for a compression distance of exactly 100 μm were each calculated by averaging raw IL data between 99.5 μm and 100.5 μm of compression. In some cases, the contact point prediction is off, resulting in the appearance of fringes after contact. It should be understood that in these cases, the IL curve should be shifted so that the fringes end at a compression distance of $d_{BC}$=0. Since the contact position $P_C$ is only off by a maximum of 25 μm for the data shown, the required IL curve shifts are general small relative to the total measurement range (300 μm).

The IL curves are distributed over a range of IL values because they represent measurements of multiple connectors. Looking at these overlaid IL curves, in many cases the IL curves appear flat, indicating that the IL measurement has stabilized over the 300 μm compression distance $d_{BC}$. But in other IL curves the IL value varies as compression distance $d_{BC}$ is increased.

Figure 15B:
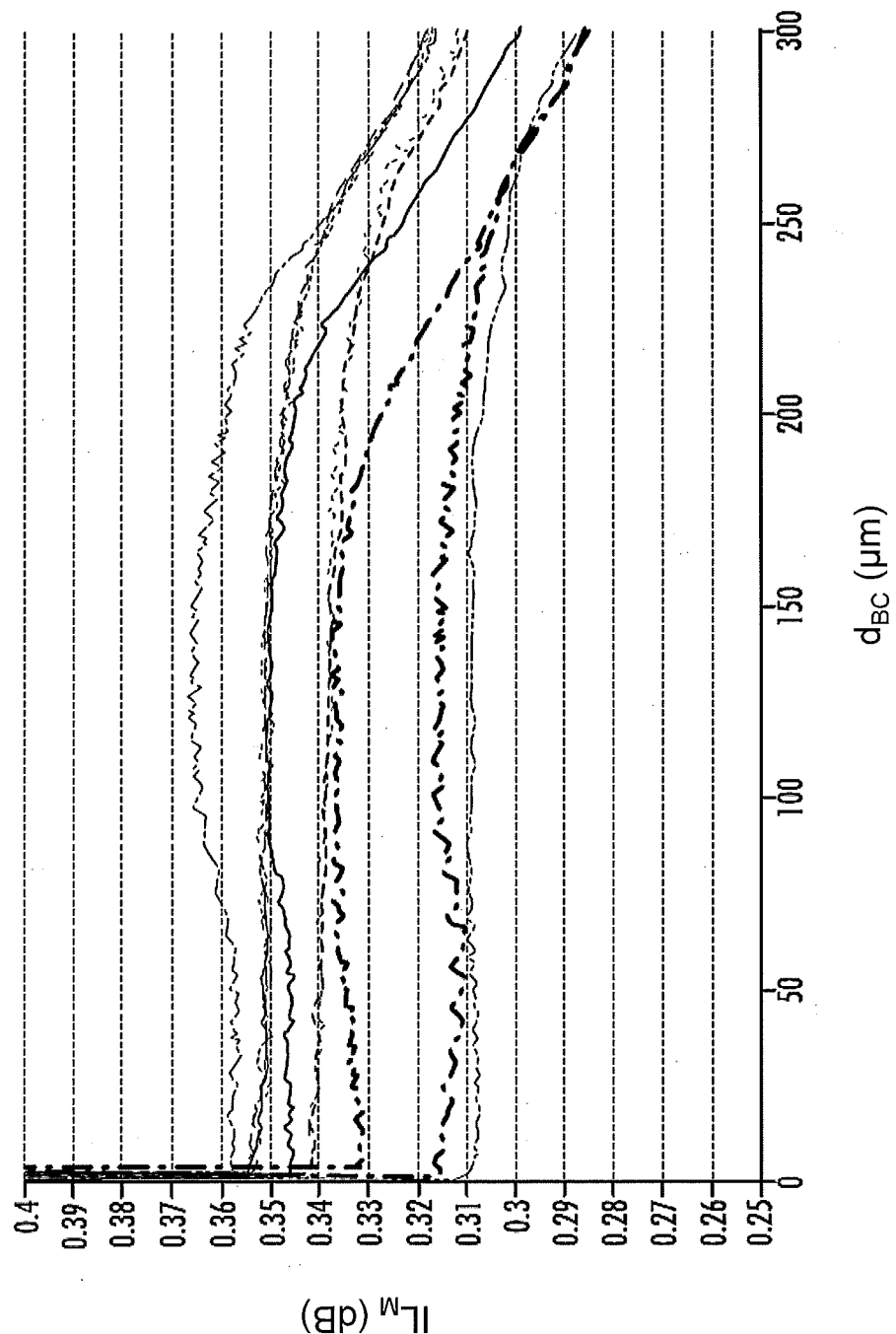
FIG. 15B is similar to FIG. 15A and plots IL curves for a single connector sample, namely connector number 27A, to clarify the IL measurement variations with the distance beyond contact $d_{BC}$.

To clarify the IL measurement variations with compression distance, FIG. 15B provides IL curves for a single connector sample, namely sample (number) 27A. The IL measurements appear to stabilize after a compression distance $d_{BC}$ of 50-100 μm, but a large IL drift occurs in many cases after 200 μm compression. The slope of the IL curve at 300 μm indicates that a stable IL measurement value has not been reached at $d_{BC}$=300 μm for this sample. As mentioned above, the large drops in IL near $d_{BC}$=0 μm compression arise from fringes due to errors in the prediction of the contact position $P_C$.

Figure 15C:
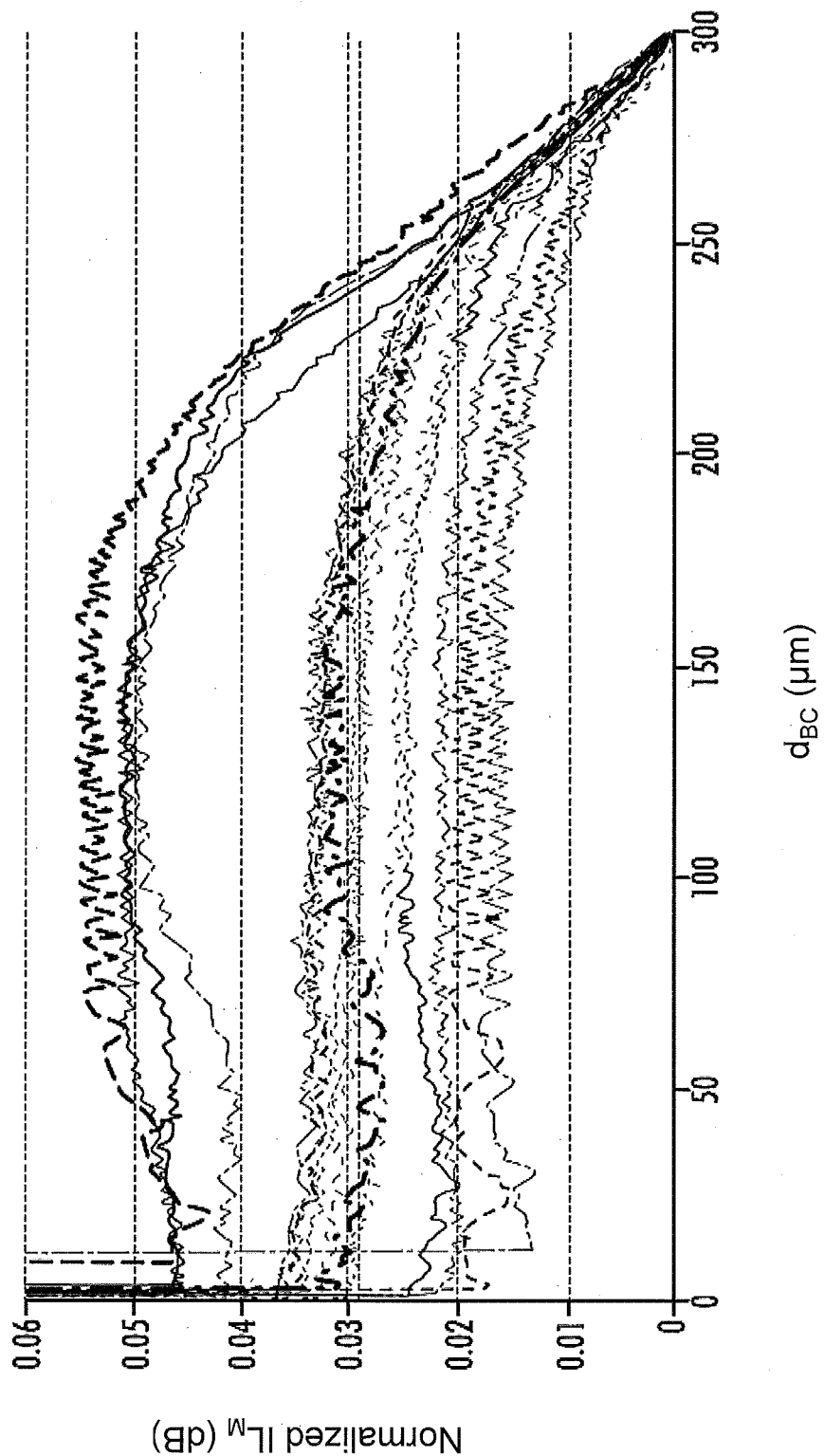
FIG. 15C is the same plot as FIG. 15A, but wherein the data is normalized to have a measured IL value of 0 dB at the maximum distance $d_{BC}$ (i.e., maximum compression distance)

The IL measurement data can be normalized, as shown in the plot of FIG. 15C, so that at the maximum compression distance, the IL value is forced to 0 dB. The variation in IL with $d_{BC}$ appears at least bimodal, implying that there may be different systematic ways that the IL is modified during compression. For example, over the range of $d_{BC}$ from 0 to 100 μm, the IL measurement remains roughly constant or increases slightly. At compression $d_{BC}$>150 μm, all of the IL measurements show a downward drift. This IL drift may be due to slightly improved ferrule-to-ferrule alignment in the ceramic sleeve at higher compression forces.

Figure 15D:
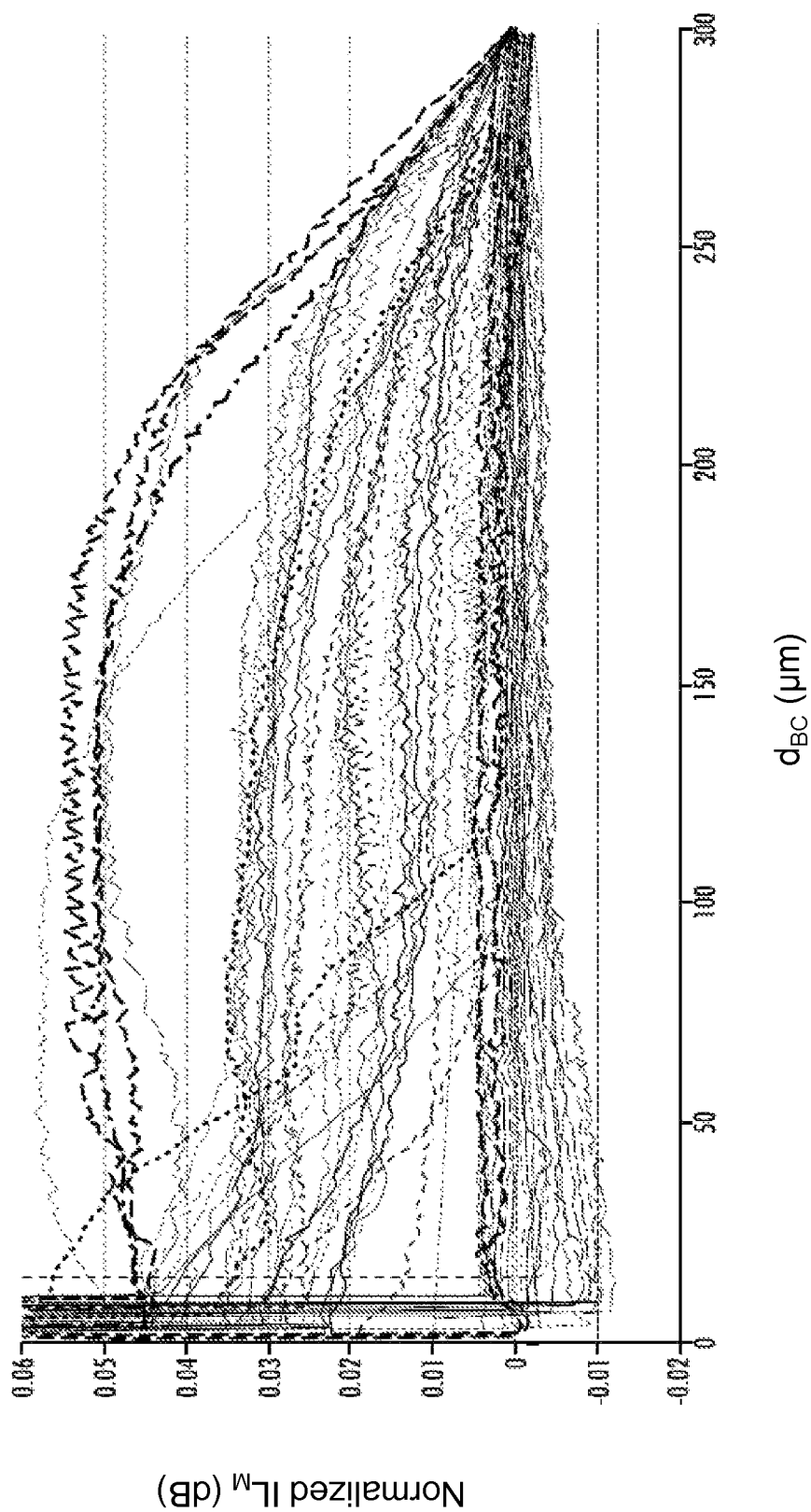
FIG. 15D is the same plot as FIG. 15C, but for the first 10 measured connectors.
Figure 15E:
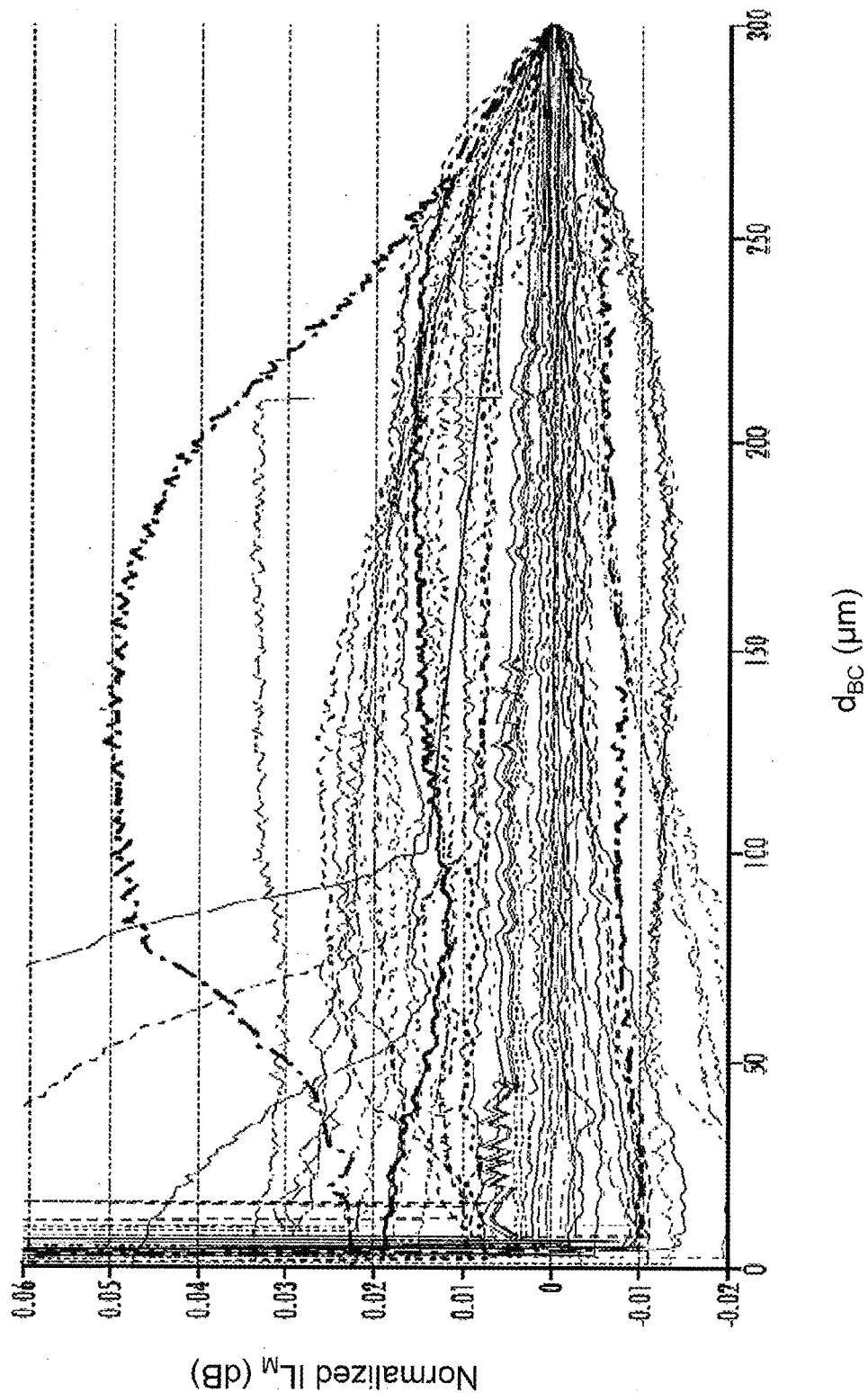
FIG. 15E is the same plot as FIG. 15D, but for the second 10 measured connectors.

FIG. 15D plots the normalized IL measurements for the first 10 measured samples. The plot shows significant variations in the way IL measurements converge with the distance beyond contact $d_{BC}$. Similar variations are visible in normalized IL plots for the second 10 samples as shown in FIG. 15E. Most connectors tend to converge to stable IL values after $d_{BC}$=100 μm, with 55% of samples converging to <0.02 dB of final IL value after $d_{BC}$<20 p.m. The remaining samples require at least a $d_{BC}$ of 90 to 270 μm to achieve IL convergence. As with IL measurements for sample 27A, in many cases the IL slope at 300 μm compression distance indicates that some IL measurements have not converged.

Figure 15F:
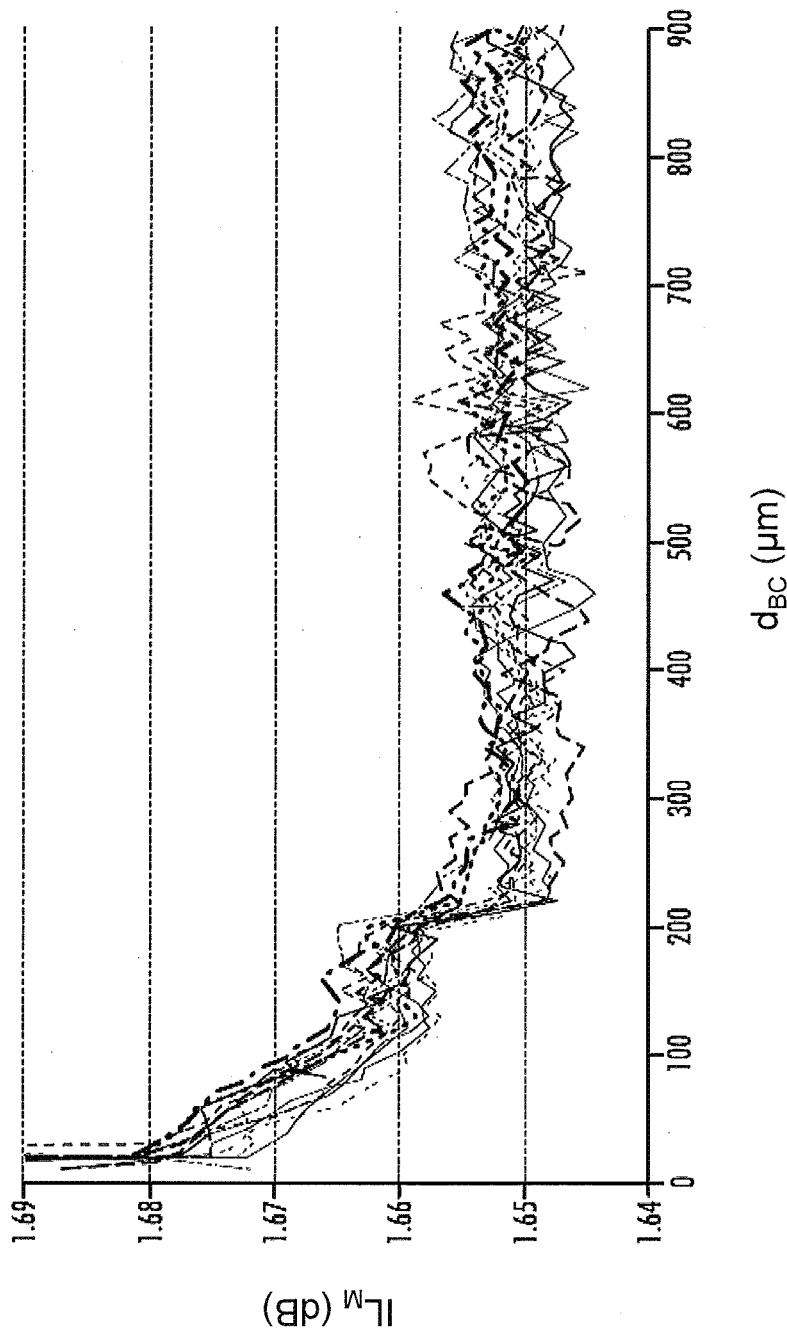
FIG. 15F plots the measured insertion loss $IL_M$ versus the distance beyond contact $d_{BC}$ (µm) overlaid for 16 measurements, with the plot showing how the IL measurement generally converges after $d_{BC}$=400 µm.

Based on the observation that in some cases the IL measurements have not converged after $d_{BC}$=300 μm, a second experiment was conducted on a single sample where the maximum compression distance was increased to $d_{BC}$=900 p.m. FIG. 15F plots the measured insertion loss $IL_M$ versus the distance beyond contact $d_{BC}$ (μm) overlaid for 16 measurements, with the plot showing how the IL measurement generally converges after $d_{BC}$=400 μm. For this sample, the IL measurement drops significantly for $d_{BC}$ in the range from 0 to 150 μm, and then levels off over the range 150-200 μm. As observed previously, the gradual reduction in IL value with $d_{BC}$ exhibits a bimodal behavior. At around $d_{BC}$=200 μm, many IL measurement curves exhibit a sudden drop to a value that then remains stable over the remaining 700 μm of compression. The remaining IL measurement curves without the sudden drop continue to drift to lower IL values until they stabilize at around $d_{BC}$=400 μm.

Based on measurements made to date, an example distance beyond contact $d_{BC}$ to minimize IL drift error is $d_{BC}$≥500 μm. Also, t in almost all cases the total IL change between contact and full compression is <0.025 dB, which is in the neighborhood of the Measurement error of system 10. To ensure a maximum IL drift of <0.01 dB smaller, compression distances $d_{BC}$ of 200 to 300 μm are expected to be adequate for many IL measurement applications.

Connector manufacturing IL measurement processes involving reference to DUT connector contact have reported limited reference connector lifetimes that can vary from hours to a day or more, involving tens to hundreds of DUT connector measurements. Operators identify reference connector failure when coupling measurements with DUT connectors exhibit excessively large IL values that cannot be eliminated via repeated cleaning of the reference connector. While the exact source of reference connector IL increase has not been characterized, it is thought that the increase is linked to irreversible fiber end face damage and impacted debris.

A key motivation for pursuing near-contact and controlled-contact IL measurements is the extension of reference connector lifetime by eliminating fiber end face damage. The near-contact IL measurement approach achieves this result by preventing reference connector to DUT connector contact, while the controlled-contact IL measurement method disclosed herein achieves this result by making contact at velocities that are one to two orders of magnitude lower that those used in standard in-adapter connector measurements.

Experiments have been carried out where a pair of SC-UPC connectors were repeatedly mated and de-mated using system 10 of FIG. 1 and a ceramic sleeve as alignment member 200 over five-thousand times with no damage to fiber end faces observable afterward. Measured IL values toward the end of the experiments also agree well with IL measurements made at the start of the experiments.

Debris Detection

Figure 16A:
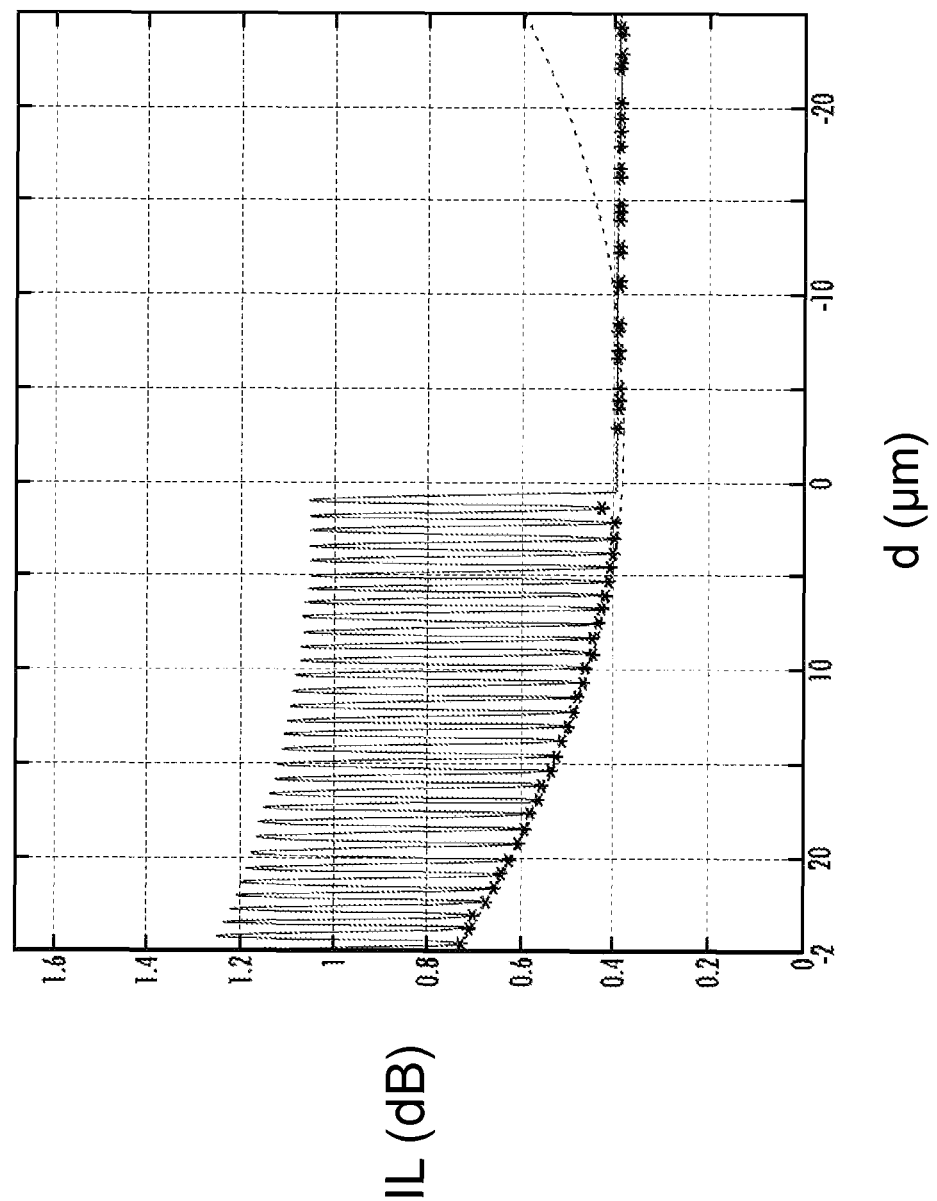
FIG. 16A plots the insertion loss IL (dB) versus gap distance d (μm) for the case where there is no debris present between the reference and DUT connector end faces.

As discussed above, when making an IL measurement using system 10, immediately before the DUT and reference ferrule fiber end faces 65R and 65D make contact, strong interference fringes appear in the measured IL signal. If both fiber end faces 65R and 65D are free from debris at contact, the IL fringes normally cease abruptly at contact. The fringe pitch remains approximately constant right up to ferrule contact, indicating that the gap distance d is being reduced at a constant rate (i.e., constant fringe velocity), as shown in FIG. 16A, which plots the insertion loss IL (dB) versus gap distance d (μm) for the case where there is no debris present.

Figure 16B:
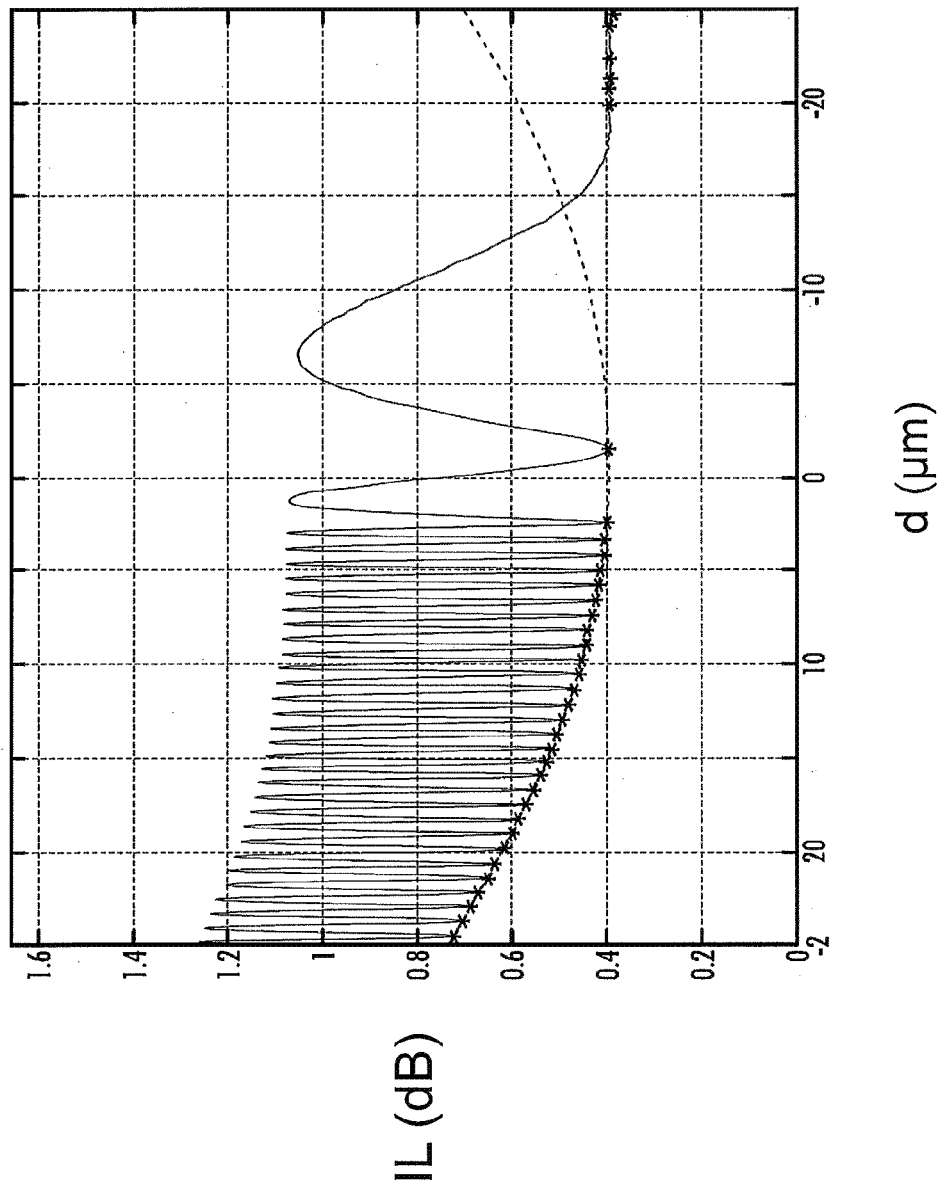
FIG. 16B is similar to FIG. 16B but with debris present between the reference and DUT connector end faces.

If debris is trapped between the fiber end faces 65R and 65D, the ferrule velocity v slows slightly just before contact as the debris is partially compressed by the approaching ferrule end faces 92R and 92D. This velocity reduction results in a sudden increase in measured IL fringe pitch that is easily identified using system 10. FIG. 16B is similar to FIG. 16A, but for the case when there is debris present between the reference and DUT fiber end faces 65R and 65D. The resulting change in the fringe pitch can be used to identify the presence of debris so that actions can be taken before subsequent IL measurements are affected adversely.

Changes in the fringe pitch can also induce changes in the shape of the IL minima curve formed by tracing a line through all fringe minima points. As the fringe pitch increases, the slope of the IL curve in the expanded fringe pitch region will be reduced. This sudden reduction in IL slope can also be used to detect debris that is trapped between connector ferrule end faces.

Even if the fringe pitch does not change, sudden deviations in IL curve slope can flag conditions where one connector ferrule has experienced a minor lateral shift within the sleeve. This shift may be at least partially due to buildup of debris trapped between the connector ferrule end face bevel and the inside surface of the alignment sleeve.

Debris Detection Methods

Analysis of IL measurement data after each measurement run can identify changes in IL slope and fringe pitch that signals that debris is trapped between the reference and DUT ferrule endfaces 92R and 92D. The observed change in IL immediately prior to contact provides a signature that can be used to determine the type of trapped debris. For example, soft debris will result in an extended region of fringe pitch increase as the debris is gradually compacted. This change in fringe pitch is easily identified. Harder debris particles will produce more sudden changes in fringe pitch.

System 10 can use this information to determine the severity of the debris impact on the ferrule end face(s). Based on a limit threshold, such as the number of fringes that have been affected by debris impact or the corresponding magnitude of ferrule velocity reduction, recommend that the reference connector 70R be immediately examined and possibly re-cleaned.

As shown in FIG. 16B, the increase in IL fringe pitch can occur suddenly, enabling the possibility of identifying debris immediately upon first contact with debris. Since each successive IL fringe minima represents a reduction in gap distance of $\lambda/2$, using a light source at $\lambda=1550$ nm, the compression of debris by as little as 750 nm is easily identified. A more advanced analysis can be employed to identify subtle departures from the oscillating variation in IL due to fringes, and flag debris after a distance of less than one fringe, to $\lambda/10$.

An advantage of detecting debris immediately is that compression of the debris on the ferrule end face(s) can be prevented. When debris is detected, the IL measurement can be terminated immediately, even before the fiber end faces 65R and 65D make full contact. This can make it easier to completely clean the ferrule end faces, extending the lifetime of the reference connector 70R by preventing severe impact and joining of debris at ferrule and fiber end faces.

In an example embodiment, system 10 is configured to perform both contact-based and non-contact-based insertion loss measurements, thereby providing a flexible approach when characterizing the insertion loss of connectors 70. The configuration of system 10 can be managed via software, with process parameters for controlled contact and near-contact IL measurement manually set by an operator or automatically loaded from a database into controller 180. Different recipes for controlled-contact IL measurements and near-contact IL measurement can be implemented to support different measurement techniques, such as the various compression distance methods discussed above, and to support different connector types. Recipes can be automatically loaded based on detection of a given connector type by system 10, e.g., via bar code scan or automated optical inspection of connector type.

Parameters can be easily modified during runtime to compensate for measurement conditions. For example, the compression distance $d_{BC}$ can be modified to compensate for a reference connector 70R with an excessively high or excessively low connector axial compression spring constant.

In an example, system 10 can be housed in a compact enclosure. A fully-integrated system 10 may provide a positive pressure environment that includes stations for connector cleaning, visual inspection and IL measurement position along a common motion stage in a single enclosure.

In conventional IL measurement methods, reference connector deviation from low-loss IL performance is detected when within-adapter connections with DUT connectors 70D fail to meet a minimum IL loss target. This approach is acceptable when measured IL values change suddenly, as would be the case when a reference connector fiber end face experiences significant irreversible damage or obstruction due to impacted debris. But it is unable to identify gradual drifts in reference connector IL performance until the threshold IL value is exceeded. In the meantime, measured DUT IL values will include more and more error.

One solution to this problem is to utilize system 10 mainly for near-contact measurements to prevent reference and DUT connector end face damage, with periodic controlled-contact measurements for benchmarking. Since the controlled-contact measurements are relatively infrequent, the potential for damage to the reference connector fiber end face 65R is minimized, extending the lifetime of the reference connector 70R.

Periodic controlled-contact IL measurements on the reference connector 70R can be used to provide feedback on changes in reference connector performance. For example, by observing changes in IL drift after contact, the controlled-contact measurement can identify reference connector changes, such as in the spring constant of resilient member 100R or ferrule sidewall wear. Based on these measurements, the compression distance (i.e., the distance beyond contact) $d_{BC}$ can be modified to maintain uniform reference connector performance, or the reference connector can be flagged for replacement.

Advantages

The controlled-contact systems and methods disclosed herein have a number of advantages, which are summarized below. First, the systems and methods allow for measuring connector loss in a manner that minimizes damage to the fiber end face 65D of the DUT connector 70D as well as the fiber end face 65R of the reference connector 70R.

Secondly, the observation of IL fringes immediately before contact can provide information on presence of debris on connector ferrule end faces. In particular, this debris detection method can be implemented after each controlled-contact measurement to allow an operator to inspect and clean the reference connector. Alternatively, the debris may be detected during the measurement, and within a compression distance as small as 75 nm. If debris is detected, the measurement can be terminated before full contact is made between DUT and reference connectors, further minimizing the potential for damage or debris collection on the reference fiber end face. Compared to non-contact methods, such as disclosed in the '133 application and the '954 application, the controlled-contact method can exercise the resilient member 100 in the connector 70 and detect any contribution to the insertion loss due to fiber buckling in the boot of the connector.

Third, the insertion loss measurement can be made quickly, e.g., in only a few seconds, once the DUT connector 70D is inserted in system 10. The systems and methods can also reduce the variability of the optical loss measurement compared to the traditional physical contact methods used in the industry. In addition, the system and methods can also identify other losses mechanisms in the object by analysis of signature patterns in the IL profile and/or other parameters in the measurement.

Fourth, the controlled-contact systems and methods meet industry standard connector measurement requirements for contact between connector ferrules, which may be an issue for non-contact measurement approaches. The controlled-contact systems and methods can be readily extended to include Return Loss measurements after contact is made, consistent with customer expectations and preferences. Return Loss measurements made during ferrule-ferrule approach to contact can also be used to provide feedback as to when the ferrule end faces are separated by a small gap distance. In this case, the Return Loss measurements initially provide extremely low values, but very close to contact measured values rapidly increase as light backreflects into the reference fiber. This indication of ferrule end face proximity can be used independently or in conjunction with other optical or non-optical proximity measurement techniques described herein.

Fifth, the systems and methods can significantly reduce the cost associated with connector manufacturing inspection by eliminating or reducing the use of connector adapters or specialized reference jumpers. Extension of reference jumper lifetime is expected to provide significant cost reduction for jumper fabrication. Also, because the systems and methods disclosed herein reduce the risk of end face damage to both the DUT and reference connectors, fewer visual inspections and cleaning steps are required and a reduced connector scrap volume can be achieved.

Sixth, system 10 can employ a number of different approaches for monitoring the relative locations of reference and DUT ferrules, i.e., the system is agnostic to the exact sensors used. As improved distance/location sensors become available, they may be employed for even greater sensitivity, speed, or improved size. Further, system 10 as configured to implement the controlled-contact IL measurement methods disclosed herein can also be configured to perform near-contact IL measurements by modifying the control algorithm and recipe parameters in controller 180, as described in the '133 application or the '954 application.

t will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A controlled-contact method of measuring an insertion loss of a device-under-test (DUT) connector having a first ferrule with a first optical fiber and a first end face with a reference connector having a second ferrule with a second optical fiber and a second end face, comprising:
    axially aligning the first and second ferrules so that the first and second end faces are confronting and spaced apart to define a variable gap having a gap distance with an initial value;
    reducing the gap distance at a first rate by moving the reference and DUT connectors together at a connector velocity in the range of 1 mm/s to 5 mm/s while measuring a coupled optical power between the first and second optical fibers;
    reducing the gap distance at a second rate slower than the first rate by reducing the connector velocity to be in the range from 5 $\mu$m/s to 500 $\mu$m/s while measuring the coupled optical power, until the first and second end faces come into contact at a gap distance of 0 $\mu$m, while continuing to measure the coupled optical power;
    after the first and second ferrules are in contact, either maintaining or increasing the connector velocity and subjecting the ferrules to an axial compression force while continuing to measure the coupled optical power; and
    measuring the insertion loss based on the measured coupled optical power as a function of the gap distance.

2. The controlled-contact method according to claim 1, wherein the connector velocity at contact is in the range from 10 $\mu$m/s to 100 $\mu$m/s.

3. The controlled-contact method according to claim 1, wherein the connector velocity at contact is in the range 20 $\mu$m/s to 30 $\mu$m/s.

4. The controlled-contact method according to claim 1, wherein the DUT connector is stationary and the reference connector is moved at the connector velocity.

5. The controlled-contact method according to claim 1, wherein the initial value of the gap distance is in the range from 50 $\mu$m to 300 $\mu$m.

6. The controlled-contact method according to claim 1, wherein the initial value of the gap distance is greater than 150 $\mu$m.

7. The controlled-contact method according to claim 1, further including:
    calculating the insertion loss on an ongoing basis using the measurements of the coupled optical power and using the slope of the insertion loss to determine the gap distance; and
    controlling the connector velocity based on the determined gap distance.

8. The controlled-contact method according to claim 1, including:
    calculating the insertion loss on an ongoing basis using the measured coupled optical power; and
    wherein a stage is used to support and move the reference connector along stage positions PS at the connector velocity, and including estimating a contact position PS=$P_C$ of the stage for which the gap distance d=0 $\mu$m from a fringe pattern of the insertion loss versus gap distance.

9. The method according to claim 1, further comprising using an alignment member configured to accommodate the first and second ferrules to maintain alignment when the first and second end faces approach each other.

10. The method according to claim 1, further comprising using a position measurement system configured to measure a relative position of the first and second ferrules to maintain alignment of the first and second ferrules when the first and second end faces approach each other.

11. The method according to claim 1, further comprising measuring the insertion loss as a function of the gap distance based on the measured coupled optical power, and determining whether debris is present between the first and second end faces based on the measured insertion loss as a function of the gap distance.

12. A controlled-contact method of measuring the insertion loss of a compressible device-under-test (DUT) connector having a first ferrule with a first optical fiber and a first end face with a compressible reference connector having a second ferrule with a second optical fiber and a second end face, comprising:

moving the reference connector toward the DUT connector at a first reference-connector velocity the range from 1 mm/s to 5 mm/s when the first and second end faces are separated by a gap distance of greater than 150 µm while measuring an amount of coupled optical power between the first and second optical fibers;

moving the reference connector toward the DUT connector at a second reference-connector velocity the range from 10 µm/s to 100 µm/s when the first and second end faces are separated by a gap distance of less than 150 µm while continuing to measure the amount of coupled optical power as a function of the gap distance;

moving the reference connector toward the DUT connector at a third reference-connector velocity equal to or greater than the second reference-connector velocity when the first and second end faces are in contact and the reference and DUT connectors compress to a compression distance while continuing to measuring the amount of coupled optical power as a function of the gap distance; and determining the insertion loss based on the measured amount of coupled optical power as a function of the gap distance.

13. The controlled-contact method according to claim 12, wherein the compression distance is at least 400 µm.

14. The controlled-contact method according to claim 12, wherein the third reference-connector velocity is greater than the second connector velocity.

15. The controlled-contact method according to claim 12, wherein the insertion loss measurement as a function of the gap distance includes a fringe pattern, and further including detecting the presence of debris between the first and second end faces by monitoring a change the fringe pattern.

16. The controlled-contact method according to claim 12, wherein the second reference-connector velocity is in the range from 10 µm/s to 100 µm/s.

17. The controlled-contact method according to claim 16, wherein the second reference-connector velocity is in the range 20 µm/s to 30 µm/s.

18. The controlled-contact method according to claim 12, including measuring the gap distance based on a slope of the measured insertion loss.

19. The controlled-contact method according to claim 12, including maintaining axial alignment of the first and second ferrules using a ceramic sleeve.

20. The controlled-contact method according to claim 12, including maintaining axial alignment of the first and second ferrules using a position measurement system.

21. The controlled-contact method according to claim 19, including maintaining the axial alignment using either an alignment member or a position measuring system.

22. A controlled-contact method of measuring the insertion loss of a compressible device-under-test (DUT) connector having a first ferrule with a first optical fiber and a first end face with a compressible reference connector having a second ferrule with a second optical fiber and a second end face, comprising:

axially aligning the first and second ferrules of the reference and DUT connectors to define a gap distance of at least 200 µm;

causing the first and second end faces to approach each other at a connector velocity in the range from 1 mm/s to 5 mm/s while maintain the axial alignment and while measuring an insertion loss between the first and second optical fibers;

when the gap distance is in the range from 0 to 200 µm, reducing the connector velocity to be in the range from 10 µm/s to 500 µm until the first and second end faces are in contact, while maintaining the axial alignment and while measuring the insertion loss; and after the first and second end faces are in contact, increasing the connector velocity while subjecting the first and second ferrules to an axial compression force while measuring the insertion loss.

* * * * *